United States Patent
Kumagai et al.

(10) Patent No.: US 8,907,624 B2
(45) Date of Patent: Dec. 9, 2014

(54) MULTI-BATTERY PACK BATTERY SYSTEM WITH DIRECT COMMUNICATION BETWEEN CONTROLLER AND THE BATTERY PACKS

(75) Inventors: Eiji Kumagai, Kanagawa (JP); Morihiko Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 724 days.

(21) Appl. No.: 13/098,962

(22) Filed: May 2, 2011

(65) Prior Publication Data

US 2011/0300415 A1    Dec. 8, 2011

(30) Foreign Application Priority Data

Jun. 7, 2010   (JP) ................. 2010-129730

(51) Int. Cl.
*H01M 10/46*   (2006.01)
*H02J 7/00*    (2006.01)
*H01M 10/42*   (2006.01)

(52) U.S. Cl.
CPC ............... *H02J 7/0026* (2013.01); *Y02E 60/12* (2013.01); *H01M 10/4207* (2013.01); *H02J 7/0021* (2013.01)
USPC ......................................................... 320/116

(58) Field of Classification Search
USPC ................. 320/103, 107, 112, 116, 118, 119; 429/96, 99, 100
See application file for complete search history.

(56) References Cited

U.S. PATENT DOCUMENTS 8,283,892 B2 * 10/2012 Miyazaki et al. ............. 320/134
2006/0012336 A1 * 1/2006 Fujitta ........................... 320/119
2011/0127962 A1 * 6/2011 Murao et al. .................. 320/118

FOREIGN PATENT DOCUMENTS

| CN | 101399453 A | 4/2009 |
| JP | 08-140204 | 5/1996 |
| JP | 2006-029895 | 2/2006 |
| JP | 2009-100644 | 5/2009 |
| JP | 2010-063259 | 3/2010 |

OTHER PUBLICATIONS

Japanese Office Action issued in connection with related Japanese Patent Application No. 2010-129730 dated Mar. 4, 2014.
Chinese Office Action issued in connection with related Chinese Patent Application No. 201110137137.8 mailed May 6, 2014.
Japanese Office Action issued in connection with related Japanese Patent Application No. 2010-129730 dated Jun. 3, 2014.

* cited by examiner

*Primary Examiner* — Edward Tso
(74) *Attorney, Agent, or Firm* — Dentons US LLP

(57) ABSTRACT

A battery system includes a battery pack configured to include at least a plurality of battery cells that are connected in series, a monitor that monitors a state of the plurality of battery cells, and a controller to which an output of the monitor is supplied, a battery pack module in which the battery pack in a first order to the battery pack in an Nth order are connected in series, and an integrated controller that is connected with the battery pack in the first order of the battery pack module. Isolators are respectively disposed among the battery pack in the first order to the battery pack in the Nth order, and a signal is transmitted from the battery pack in an order of n−1 (N≥n≥2) to the battery pack in an order of n via one of the isolators.

5 Claims, 22 Drawing Sheets

MULTI-BATTERY PACK BATTERY SYSTEM WITH DIRECT COMMUNICATION BETWEEN CONTROLLER AND THE BATTERY PACKS

BACKGROUND OF THE INVENTION

1. Field of the Invention

The present invention relates to a battery system using a number of battery cells.

2. Description of the Related Art

In a case where a number of battery cells such as hundreds of battery cells are used so as to generate a large output, such configuration that a plurality of battery packs are connected in series is employed. Such configuration is called a battery system. A battery pack is a unit obtained by assembling a plurality of battery cells and a controller. A battery pack MOD is configured as shown in FIG. 1. A controller CNT is provided to a battery unit BT in which a plurality of battery cells, for example, 16 battery cells (for example, lithium-ion batteries) are connected in series. The controller CNT outputs information of inside states such as a voltage, current, and a temperature of each of the cells of the battery unit BT. For example, one battery pack MOD outputs 16×3.5 V=56 V.

Further, as shown in FIG. 2, N pieces of battery packs MOD1 to MODN are connected in series. The battery packs MOD1 to MODN are connected to an interface bus BS via an insulating unit IS. To each of the battery packs MOD, an insulating interface IF is provided so as to connect the controller CNT and the interface bus BS which is externally provided, as shown in FIG. 1. This insulating interface IF insulates the battery pack MOD from the interface bus BS. The insulating unit IS shown in FIG. 2 collectively indicates the insulating interfaces IF of the battery packs MOD1 to MODN.

To the interface bus BS, a controller which controls the whole of the battery system (referred to below as an integrated controller) ICNT is connected. The controller CNT of each of the battery packs MOD communicates with the integrated controller ICNT. That is, the integrated controller ICNT receives information of the inside states of each of the battery packs MOD, and supplies and cuts off charging current and discharging current with respect to each of the battery packs MOD so as to control charge and discharge of each of the battery packs MOD. The integrated controller ICNT supplies an output (N×56 V) of the series connection of the N pieces of the battery packs MOD to a load. In an example of N=14, an output is 14×56 V=784 V.

Since the N pieces of the battery packs MOD are connected in series, as shown in FIG. 2, a basis voltage of the battery pack MOD1 on the lowest side is 0 V and a basis voltage of the battery pack MOD2 which is on the upper side of the battery pack MOD1 is 56 V. A basis voltage of the battery pack MODN on the highest side is 56 V×(N−1). In the example of N=14, the basis voltage is 56 V×13=728 V.

A specific connection of a battery system of the related art is shown in FIG. 3. An input signal from the integrated controller ICNT is supplied to an input terminal 1. A high level (Hi) of the input signal is +12 V and a low level (Lo) of the input signal is 0 V, for example. The battery packs MOD are respectively provided with photocouplers IF1 to IFN as the insulating interfaces IF. The battery packs MOD respectively include series regulators Reg1 to RegN, for example. Each of the photocouplers IF includes a light-emitting diode and a phototransistor which receives light from the light-emitting diode. The light-emitting diode emits light when the input signal is on the high level. The basis voltage of each of the battery packs MOD is supplied to an emitter of the phototransistor. A collector of the phototransistor is connected with an output terminal of each of the regulators Reg via a resistor.

The regulators Reg respectively generate input voltages (for example, reset voltages) with respect to the controllers CNT1 to CNTN from voltages of the battery units BT of the battery packs MOD. A direct-current voltage with respect to the controllers CNT1 to CNTN is +12 V with respect to the basis voltage. Output voltages of the regulators Reg1 to RegN are respectively extracted by output terminals $2_1$ to $2_N$ via transistors Tr1 to TrN. The controllers CNT1 to CNTN are respectively connected to the output terminals $2_1$ to $2_N$.

When a high level input signal is supplied to the input terminal 1, the light-emitting diodes emit light and the phototransistors are turned on in the photocouplers IF1 to IFN. When the phototransistors are turned on, the transistors Tr1 to TrN are turned on and a high level output signal is generated with respect to the output terminals $2_1$ to $2_N$. On the other hand, when the low level input signal is supplied to the input terminal 1, the light-emitting diodes do not emit light and the phototransistors are off in the photocouplers IF1 to IFN. Since the phototransistors are off, the transistors Tr1 to TrN are turned off and a low level output signal is generated with respect to the output terminals $2_1$ to $2_N$.

The regulator Reg1 outputs a voltage of 12 V from a voltage of 56 V. Accordingly, when the transistor Tr1 is on, an output signal of Hi=12 V is generated, and when the transistor Tr1 is off, an output signal of Lo=0 V is generated. In the battery pack MOD1, a voltage up to 12 V is applied between an input side and an output side of the photocoupler IF1. In a similar manner, in the battery pack MOD2, the regulator Reg2 generates an output of 12 V+56 V=68 V from a voltage of 56 V+56 V=112 V. On the output terminal $2_2$, an output signal of (Hi=12 V+56 V, Lo=56 V) is generated. In the battery pack MOD2, a voltage up to 68 V is applied between an input side and an output side of the photocoupler IF2.

In the battery pack MODN in the highest order, the regulator RegN generates an output of 12 V+56(N−1) V from a voltage of 56 V+56(N−1) V. On the output terminal $2_N$, an output signal of (Hi=12 V+56(N−1) V, Lo=56(N−1) V) is generated. In the battery pack MODN, a voltage up to 56(N−1) V is applied between an input side and an output side of the photocoupler IFN. In a case of N=14, for example, in the battery pack MODN in the highest order, a voltage up to (56×13+12 V=728 V+12 V=740 V) is applied to the photocoupler IFN.

A breakdown voltage of a common photocoupler is 500 V at most. If such photocoupler is used in a manner to be supplied with a voltage surpassing a rating, lives of elements may be extremely shortened and, at worst, problems such as a breakdown and ignition may occur.

FIG. 4 shows a second example of a battery system of the related art. Communication between the controllers CNT1 to CNTN of the inside of the battery packs MOD1 to MODN and the integrated controller ICNT is performed through a serial interface. Specifically, a system management bus (SM bus) or the like is used as the serial interface. For example, an I2C bus can be used. The I2C bus is a synchronous serial communication bus through which communication is performed with two signal lines of a serial clock (SCL) and bidirectional serial data (SDA). Further, a ground GND line is provided.

The battery packs MOD respectively include communication transceivers COM1 to COMN and bidirectional insulating buffers BF1 to BFN. The communication transceiver COM includes a transmission part Tx and a reception part Rx with respect to the signal line SDA and a transmission part Ty and a reception part Ry with respect to the signal line SCL, as shown in FIG. 5A. To each of the communication transceivers COM, a power source voltage of 12 V, for example, is applied from the integrated controller ICNT. Here, transmission/reception indicates transmission/reception of the controller CNT of the battery pack MOD.

As shown in FIG. 5B, the insulating buffers BF are integrated circuits (IC) which insulate a primary side (VDD1, SDA1, SCL1, and GND1) from a secondary side (VDD2, SDA2, SCL2, and GND2). For example, the insulating buffer BF is composed of a transformer of the IC configuration. The power source voltage VDD1 of the primary side of the insulating buffer BF is supplied from the controller CNT of each of the battery packs MOD and corresponding power source voltage VDD2 of the secondary side is supplied from the integrated controller ICNT. In order to form these power source voltages, regulators Reg11 to Reg1N and regulators Reg21 to Reg2N are provided.

For example, in the battery pack MOD1, the regulator Reg11 generates a power source voltage of 3.3 V from the voltage of 56 V which is received from the battery unit BT and the regulator Reg21 generates a power source voltage of 3.3 V from the voltage of 12 V. In the case of the battery pack MOD1, since basis voltages of the primary side and the secondary side of the insulating buffer BF1 are both 0 V, a voltage up to 0 V is applied between the primary side and the secondary side of the insulating buffer BF1.

In the battery pack MOD2, the regulator Reg22 generates a power source voltage of 3.3 V from the voltage of 12 V, as is the case with the regulator Reg21. On the other hand, the regulator Reg12 generates a voltage of 3.3 V+56 V from the voltage of 56 V+56 V of the battery unit BT of the battery pack MOD2. This is because the basis voltage of the battery pack MOD2 is 56 V. A voltage up to 56 V is applied between the primary side and the secondary side of the insulating buffer BF2.

In the battery pack MODN in the highest order, the regulator Reg1N generates a voltage of 3.3 V+56(N−1) V from the voltage of 56 V+56(N−1) V. Accordingly, a voltage up to 0+56(N−1) V is applied between the primary side and the secondary side of the insulating buffer BFN. In the case of N=14, a voltage of 728 V is applied between the primary side and the secondary side of the insulating buffer BFN.

In a case of a common bidirectional insulating buffer, a breakdown voltage is 500 V at most. If such device is used in a manner to surpass a rating, a life of the device may be shortened and, at worst, a breakdown, smoking, ignition, or the like may occur.

A third example of the related art is described with reference to FIG. 6. A power-on signal from the integrated controller ICNT is inputted to an input terminal 10. The battery packs MOD1 to MODN respectively include photocouplers IF11 to IF1N and switching transistors Tr11 to Tr1N are respectively controlled by outputs of the photocouplers IF11 to IF1N.

Voltages of the battery units BT of the battery packs MOD are respectively supplied to emitters of the transistors Tr11 to Tr1N and the regulators Reg21 to Reg2N are respectively connected to collectors of the transistors Tr11 to Tr1N. Power-on signals of predetermined voltages from the regulators Reg21 to Reg2N are respectively extracted by output terminals $20_1$ to $20_N$. The power-on signals are respectively supplied to the controllers CNT of the battery packs MOD. The controllers CNT which receive the power-on signals respectively start operations of the battery packs MOD.

In the battery pack MOD1, the voltage of 56 V is supplied from the battery pack BT to the emitter of the transistor Tr11. When a low level signal is supplied to a base of the transistor Tr11 from the photocoupler IF11, the transistor Tr11 is turned on. The voltage of 56 V is inputted into the regulator Reg21 via the transistor Tr11 and a power-on signal of 12 V is outputted to the output terminal $20_1$.

Into the input terminal 10, a power-on signal of 12 V is inputted in power-on time, and a power-on signal of 0 V is inputted in power-off time. When the power-on signal is inputted into the photocoupler IF11, a light-emitting diode of the photocoupler IF11 emits light and a phototransistor is turned on in power-on time. Consequently, an output of the photocoupler IF11 becomes low level, for example, 1 V (a saturation voltage of the phototransistor). In this case, the transistor Tr11 is turned on. On the other hand, since the light-emitting diode does not emit light in power-off time, the output of the photocoupler IF11 becomes high level, for example, 56 V. In this case, the transistor Tr11 is not turned on and a power-on signal is not generated.

In the battery pack MOD1, the maximum value of a voltage which is applied between an input and an output of the photocoupler IF11 is 56 V. In the battery pack MOD2, the basis voltage is 56 V and the voltage from the battery unit BT is 56 V+56 V=112 V. Accordingly, the maximum value of a voltage which is applied between an input and an output of the photocoupler IF12 is 112 V. In the battery pack MODN in the highest order, the basis voltage is 0 V+56(N−1) V and the voltage of the battery unit BT is 56 V+56(N−1) V. Accordingly, the maximum value of a voltage which is applied between an input and an output of the photocoupler IF1N is 56(N−1) V. In the case of N=14, a voltage of 728 V is applied between the input and the output of the photocoupler IF1N.

In a case of a common photocoupler, a breakdown voltage is 500 V at most. If such device is used in a manner to surpass a rating, a life of the device may be shortened and, at worst, a breakdown, smoking, ignition, or the like may occur.

A fourth example of the related art is described with reference to FIG. 7. This example shows the configuration for extracting a state signal which is outputted from each of the battery packs MOD to an output terminal 21. The integrated controller ICNT is connected to the output terminal 21. As the state signal, OV, DIS, and CHG are shown. The state signal OV becomes low level when the battery unit BT of the battery pack MOD is overcharged. The state signal DIS becomes low level when the battery unit BT of the battery pack MOD is over-discharged. The state signal CHG becomes low level when a problem occurs while charging the battery unit BT of the battery pack MOD.

The battery packs MOD respectively include metal oxide semiconductor (MOS) field effect transistors (FET) Q1 to QN to which the state signal (one of the state signals OV, DIS, and CHG) is supplied to their gates. The MOSFETs Q1 to QN are n-channel type, so that the MOSFETs Q1 to Qn are turned on when a positive voltage is applied between a gate and a source. Light-emitting diodes of photocouplers IF21 to IF2N are respectively inserted between drains of the MOSFETs Q and output terminals of regulators Reg31 to Reg3N.

Collectors/emitters of phototransistors of the photocouplers IF21 to IF2N are connected in series. A predetermined direct-current voltage, for example, +12 V which is outputted from the integrated controller ICNT is supplied to a collector of the battery pack MODN. An emitter of the phototransistor of the photocoupler IF21 of the battery pack MOD1 on the lowest stage is connected to the basis voltage of 0 V via a resistor.

When a state signal becomes low level in any of the battery packs MOD1 to MODN, the MOSFET Q to which the state signal is supplied is turned from on to off. For example, if the state signal becomes low level in the battery pack MOD2, the MOSFET Q2 is turned from on to off. Accordingly, power feeding to the light-emitting diode of the photocoupler IF22 is cut off and the phototransistor of the photocoupler IF22 is turned off. Consequently, the voltage value of the output terminal 21 becomes 0 V.

When the state signals of all of the battery packs MOD1 to MODN are high level, the phototransistors of all of the photocouplers IF21 to IF2N are turned on and current flows to a resistor which is connected to the output terminal 21. Consequently, the voltage of the output terminal 21 becomes a predetermined positive voltage. The phototransistor has on resistance and, for example, voltage drop of 0.5 V occurs in one phototransistor. In the case of N=14, a sum of voltage drops is 7 V. Accordingly, a voltage of 12 V−7 V=5 V is generated on the output terminal 21.

A voltage which is applied to the photocouplers IF of the respective battery packs MOD is described. In the battery pack MOD1, a voltage up to 12 V−5 V=7 V is applied to the photocoupler IF21. In the battery pack MOD2, a voltage of (12 V+56 V)−5.5 V=62.5 V is applied to the photocoupler IF22. In the battery pack MODN in the highest order, a voltage of (12 V+56×(14−1) V)−12 V=728 V (in the case of N=14) is applied to the photocoupler IF2N.

In a case of a common photocoupler, a breakdown voltage is 500 V at most. If such device is used in a manner to surpass a rating, a life of the device may be shortened and, at worst, a breakdown, smoking, ignition, or the like may occur.

In the above-described configurations of the related art, the higher breakdown voltage of an insulating interface (a photocoupler or a bidirectional insulating buffer), which is disposed between the battery pack and the integrated controller, is demanded in the battery pack on the upper stage among the battery packs which are connected in series. Accordingly, the insulating interface has to be used while surpassing a rating. Japanese Unexamined Patent Application Publication No. 2009-100644 discloses an example of a battery system in which such problem does not arise.

In Japanese Unexamined Patent Application Publication No. 2009-100644, each battery pack includes a processing unit (microprocessor MPU), and the MPU communicates with a controller of a lower battery pack through a communication unit and communicates with a controller of an upper battery pack through an insulating unit and a communication signal. A voltage of a difference between upper and lower basis voltages is applied to the insulating unit, and therefore an insulating unit having a high breakdown voltage does not have to be used.

SUMMARY OF THE INVENTION

In Japanese Unexamined Patent Application Publication No. 2009-100644, not only the insulating unit but also the microprocessor intervene in transmission of signals among battery packs. This produces difference among times which are demanded for signal transmissions from an external integrated controller to a controller of each battery pack. As a result, time gaps are disadvantageously generated in operations of the plurality of battery packs which are included in a battery system.

It is desirable to provide a battery system which is capable of preventing an increase of a breakdown voltage of an insulating interface and in which signal transmission between a controller of each battery pack and an integrated controller is directly performed through no microprocessor.

According to an embodiment of the present invention, there is provided a battery system including a battery pack configured to include at least a plurality of battery cells that are connected in series, a monitor that monitors a state of the plurality of battery cells, and a controller to which an output of the monitor is supplied, a battery pack module in which the battery pack in a first order to the battery pack in an Nth order are connected in series, and an integrated controller that is connected with the battery pack in the first order of the battery pack module. In the battery system, isolators are respectively disposed among the battery pack in the first order to the battery pack in the Nth order, and a signal is transmitted from the battery pack in an order of n−1 (N≥n≥2) to the battery pack in an order of n via one of the isolators.

Preferable modes are shown below. A reference potential point of the battery pack in the order of n−1 (N≥n≥2) is connected to a primary side of the isolator that is included in the battery pack in the order of n, and a secondary side of the isolator that is included in the battery pack in the order of n is connected to a reference potential point of the battery pack in the order of n.

Each of the battery pack in the first order to the battery pack in the Nth order includes a direct-current voltage generation unit that generates a direct current voltage from the battery cells, a switching unit is disposed between the direct-current voltage generation unit and the controller, and ON/OFF of the switching unit is controlled by a signal from the integrated controller in an interlocking manner among the battery pack in the first order to the battery pack in the Nth order.

Each of the isolators includes an input side buffer and an output side buffer, a serial signal line from the integrated controller is connected to the input side buffer of the battery pack in the first order, a signal is outputted from a part between the isolator and the output side buffer of the battery pack in the first order to the controller of the battery pack in the first order, a signal is inputted into the input side buffer of the battery pack in the order of n from the output side buffer of the battery pack in the order of n−1 (N≥n≥2), and a signal is outputted from the output side buffer of the battery pack in the order of n to the controller of the battery pack in the order of n.

Each of the battery pack in the first order to the battery pack in the Nth order includes a direct-current voltage generation unit that generates a direct-current voltage from the battery cells, a switching unit that is controlled by an output of each of the isolators of the battery pack in the first order to the battery pack in the Nth order is provided between the battery cells and the direct-current voltage generation unit, an input side of the isolator of the battery pack in the first order is connected to an output side of the integrated controller, the switching unit is controlled by an output of the isolator of the battery pack in the order of n−1 (N≥n≥2), an output of the direct-current voltage generation unit of the battery pack in the order of n−1 is supplied to an input side of the isolator of the battery pack in the order of n, and the switching unit of the battery pack in the first order to the switching unit of the battery pack in the Nth order are controlled in an interlocking manner by an output signal of the integrated controller.

Each of the battery pack in the first order to the battery pack in the Nth order includes a direct-current voltage generation unit that generates a direct-current voltage from the battery cells, a switching unit is provided to an input side of each of the isolators of the battery pack in the first order to the battery pack in the Nth order, one end of an output side of the isolator of the battery pack in the order of n (N≥n≥2) is connected to an output side of the direct-current voltage generation unit of the battery pack in the order of n−1 and the other end of the output side of the isolator is connected to an input side of the isolator of the battery pack in the order of n−1, an output side of the isolator of the battery pack in the first order is connected to an input side of the integrated controller, and the switching unit is usually on and turning off of the switching unit is transmitted to the integrated controller by any of the controller of the battery pack in the first order to the controller of the battery pack in the Nth order.

According to the embodiment of the present invention, in a case where a signal transmission system among battery packs is configured, it is sufficient for the insulating interfaces to insulate only potential differences among the battery packs. Therefore, even though the number of battery packs which are connected in series is increased, it is sufficient for the insulating interfaces to have a dielectric strength voltage up to a voltage obtained by adding a signal voltage to a voltage of one battery pack at most. In the embodiment of the present invention, a signal is transmitted among the battery packs via no microprocessor, and thus the signal transmission can be directly performed. Accordingly, an occurrence of time lag in the signal transmission between the controllers of the respective battery packs and the integrated controller can be prevented.

DESCRIPTION OF THE PREFERRED EMBODIMENTS

Embodiments of the present invention will be described in the following order.
<1. Embodiment of the Present Invention>
<2. Another Embodiment of the Present Invention>
<3. Still Another Embodiment of the Present Invention>
<4. Yet Another Embodiment of the Present Invention>
<5. Modification>

Embodiments which will be described below are preferred embodiments of the present invention and various technically-preferable limitations are given. However, it should be noted that the scope of the present invention is not limited to these embodiments unless a description limiting the present invention is given in the following description.

1. Embodiment of the Present Invention

Figure 8:
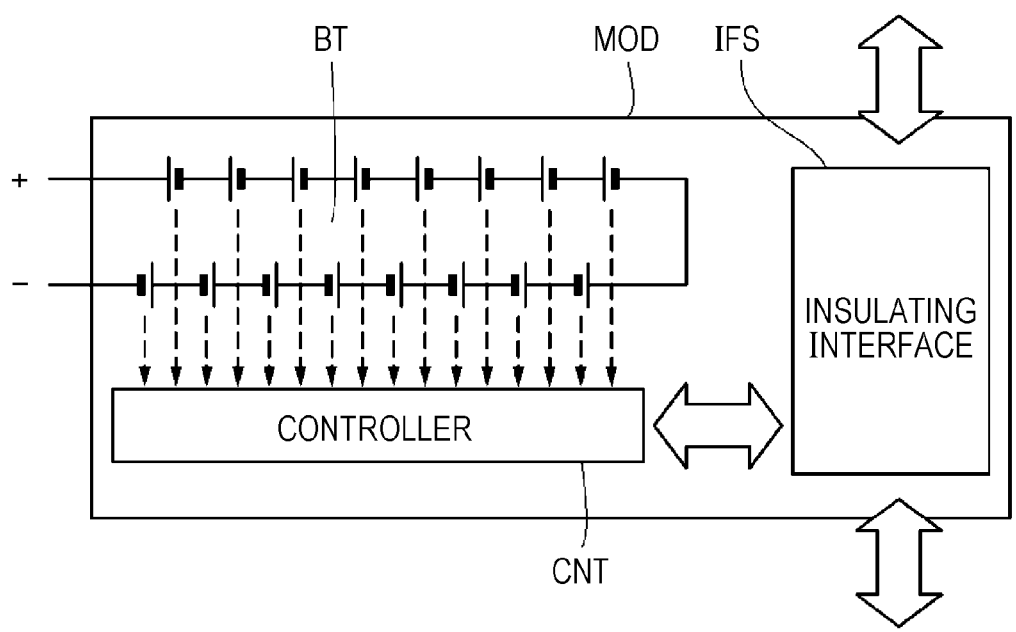
FIG. 8 is a block diagram of a battery pack according to an embodiment of the present invention.

As shown in FIG. 8, in a battery pack MOD according to an embodiment of the present invention, a controller CNT is provided to a battery unit BT in which a plurality of battery cells, for example, 16 battery cells (for example, lithium-ion batteries) are connected in series. The controller CNT outputs information of inside states such as a voltage, current, and a temperature of each of the cells of the battery unit BT. For example, one battery pack MOD outputs 16×3.5 V=56 V.

Figure 9:
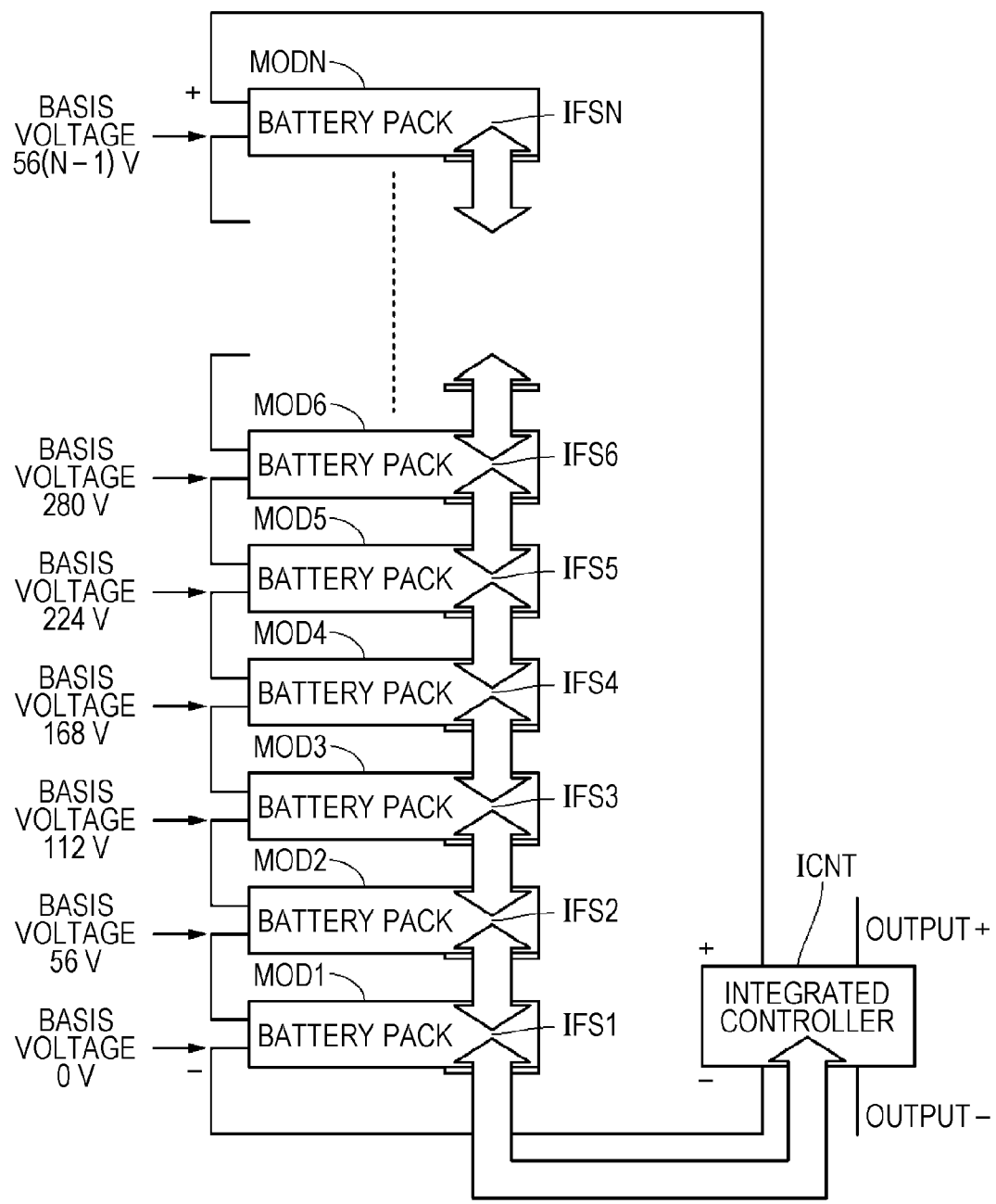
FIG. 9 is a block diagram of a battery system according to the embodiment of the present invention.

Further, as shown in FIG. 9, N pieces of battery packs MOD1 to MODN are connected in series. The battery packs MOD1 to MODN respectively include insulating interfaces which insulate among the battery packs MOD. Via photocouplers IFS1 to IFSN serving as the insulating interface, the controllers CNT of the battery packs MOD1 to MODN respectively communicate with the controller CNT in a higher order battery pack or a lower order battery pack or with an external integrated controller.

To the battery pack MOD1 in the lowest order, an integrated controller ICNT is connected. The integrated controller ICNT controls the whole of the battery system. The integrated controller ICNT receives information of the inside states of each of the battery packs MOD, and supplies and cuts off charging current and discharging current with respect to each of the battery packs MOD so as to control charge and discharge of each of the battery packs MOD. An output (N×56 V) of the series connection of the N pieces of the battery packs MOD is supplied to a load. In an example of N=14, an output is 14×56 V=784 V.

Figure 10:
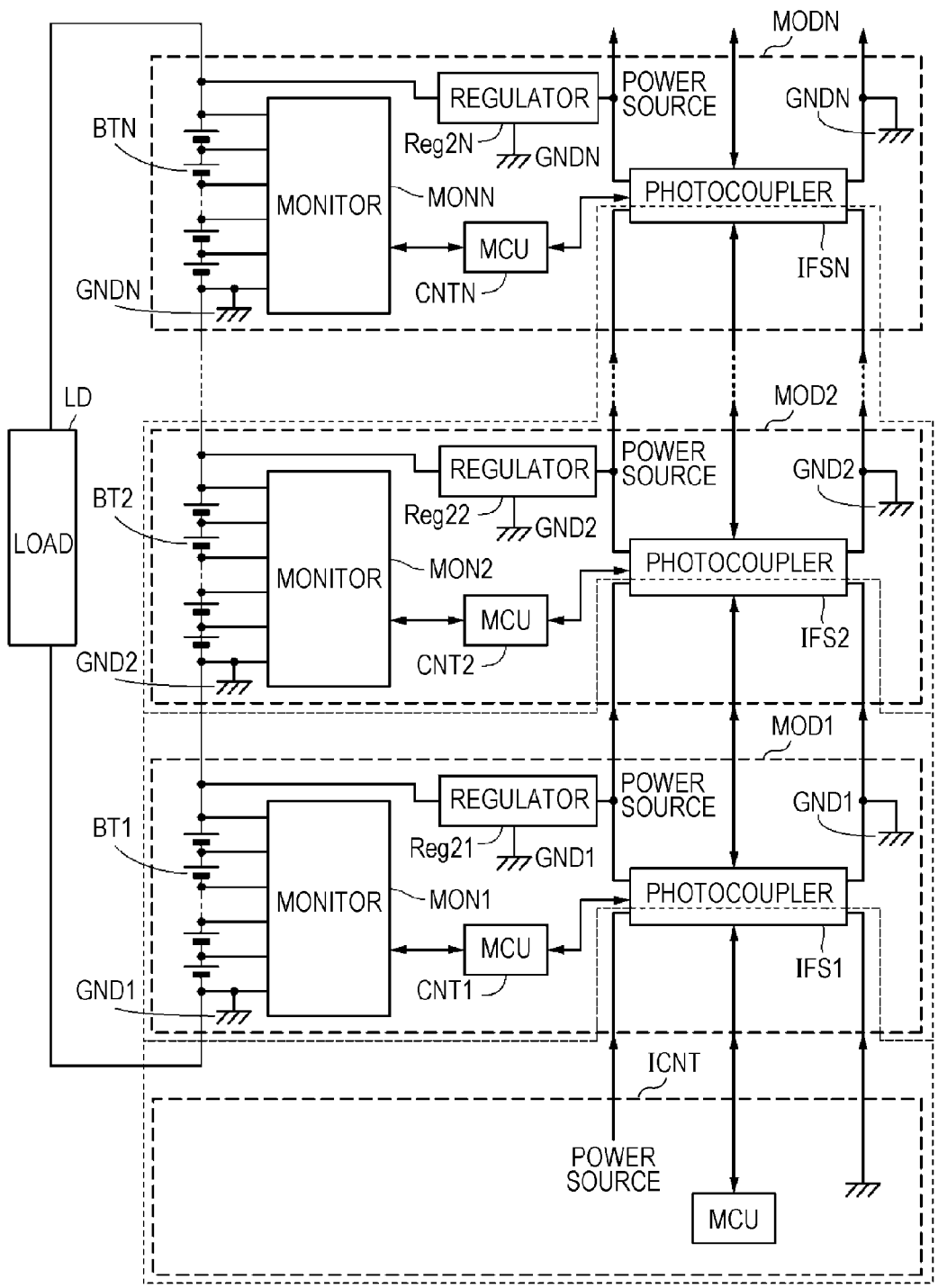
FIG. 10 is a block diagram of the configuration of main parts of the battery system according to the embodiment of the present invention.

The configuration of the main parts of the embodiment can be shown as FIG. 10. In the photocouplers IFS1 to IFSN respectively provided to the battery packs MOD1 to MODN, a primary side (a light-emitting diode) and a secondary side (a phototransistor) are insulated from each other as shown by a dashed line. The primary side of the photocoupler IFS1 of the battery pack MOD1 in the lowest order is connected with a reference potential point (that is, a power source and a ground) of the integrated controller ICNT and the secondary side of the photocoupler IFS1 is connected with a reference potential point of the battery pack MOD1. The primary side of the photocoupler IFS2 of the battery pack MOD2 in the second order is connected with the reference potential point of the battery pack MOD1 on the lower stage and the secondary side of the photocoupler IFS2 is connected with a reference potential point of the battery pack MOD2.

Thus, the primary side of the photocoupler IFS of the battery pack MOD on the upper stage is connected with a reference potential point of the battery pack MOD on the lower stage or that of the controller. Further, signals are directly transmitted from the lower order side to the higher order side via the photocouplers IFS, that is, via no microprocessors. The configuration of the main parts which are shown in FIGS. 8, 9, and 10, of the embodiment of the present invention is similar to that of other embodiments which will be described later.

Figure 11:
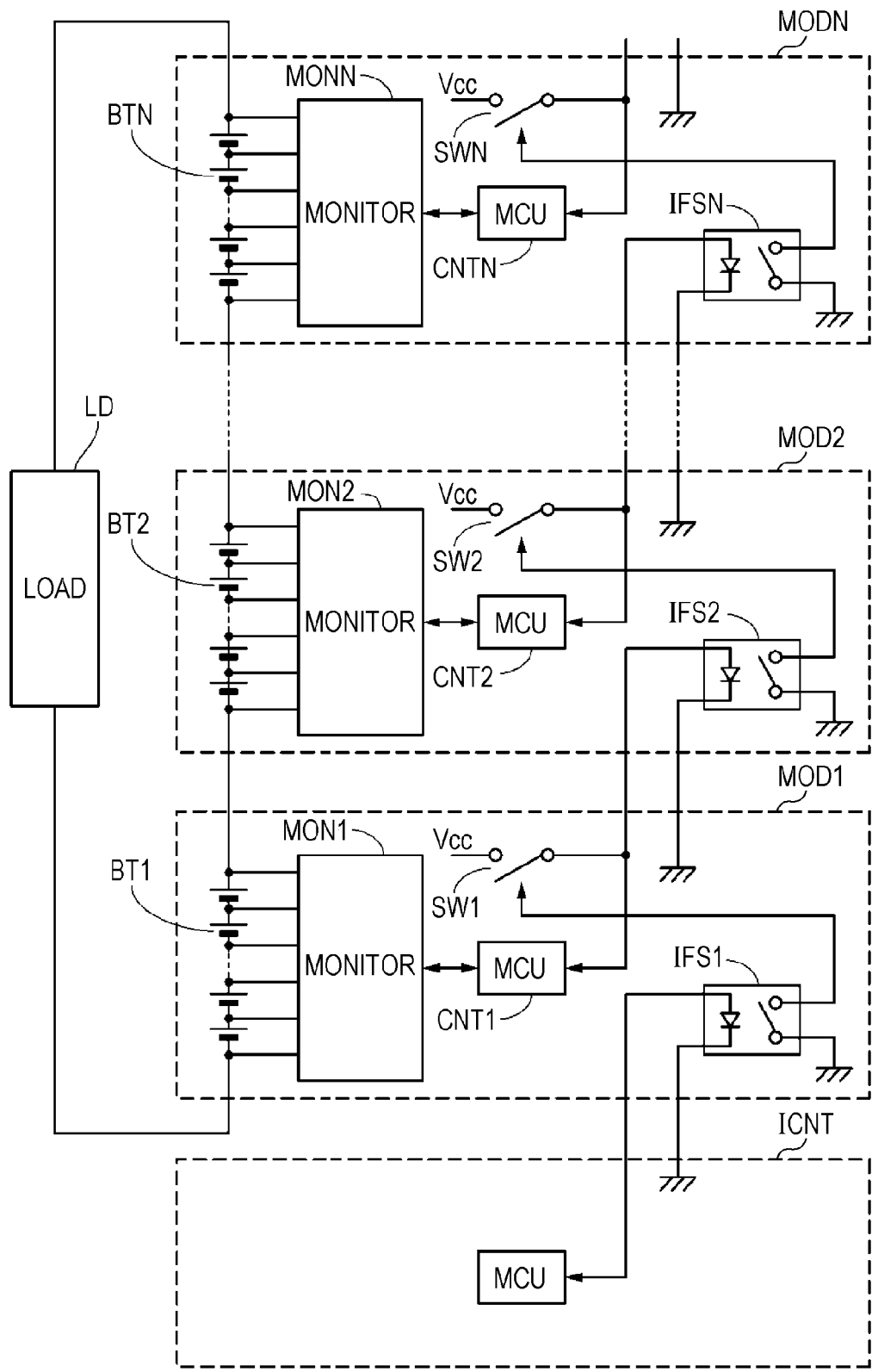
FIG. 11 is a block diagram of the battery system according to the embodiment of the present invention.
Figure 12:
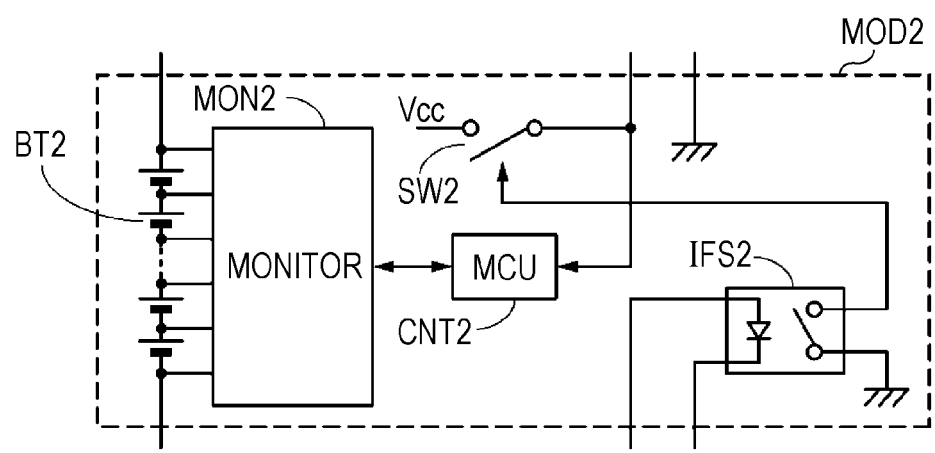
FIG. 12 is a block diagram of a battery pack according to the embodiment of the present invention.

In the embodiment, battery units BT1 to BTN of the N pieces of battery packs MOD are connected in series and a voltage of the series connection is supplied to a load LD, as shown in FIG. 11. For example, a voltage of the series connection of 16×N pieces of battery cells is supplied to the load LD. When one battery cell generates a voltage of 3.5 V and N=14, a voltage of 16×3.5 V×14=784 V is supplied to the load LD. FIG. 12 shows the configuration of a single battery pack, for example, the battery pack MOD2.

Voltages and current of the battery units BT1 to BTN of the battery packs MOD are respectively monitored by monitors MON1 to MONN. Temperatures of the battery units BT1 to BTN are also monitored respectively. Information of the inside states outputted by the monitors MON1 to MONN are respectively supplied to the controllers CNT1 to CNTN. Though it is omitted in FIGS. 11 and 12, bidirectional serial communication is performed between the controllers CNT1 to CNTN and the integrated controller ICNT. Further, with a signal from the integrated controller ICNT, a reset signal or an input signal with respect to the controllers CNT1 to CNTN of the battery packs MOD is produced.

An anode of the light-emitting diode of the photocoupler IFS1 is connected with an output of the integrated controller ICNT (MCU). A cathode of the light-emitting diode is connected with a basis voltage (0 V) of the integrated controller ICNT. One end of the phototransistor (shown as a switch in FIG. 11) of the photocoupler IFS1 is connected with the basis voltage (0 V) of the battery pack MOD1. When the phototransistor is turned on, a switching element SW1 is turned on and a direct-current voltage Vcc of a predetermined value is supplied to the controller CNT1 as a reset signal or an input signal. Further, the light-emitting diode of the photocoupler IFS2 of the battery pack MOD2 in the higher order emits light by this direct-current voltage Vcc.

As is the case with the battery pack MOD1, in the battery pack MOD2 as well, a switching element SW2 is turned on, then a reset signal or an input signal with respect to the controller CNT2 is generated, and the direct-current voltage Vcc is supplied to the battery pack MOD3 in the higher order. Thus, the output (high level) of the integrated controller ICNT can be transmitted to all of the battery packs MOD. When the output of the integrated controller ICNT is low level, the switching elements SW1 to SWN of all of the battery packs MOD are off.

Thus, a high level signal or a low level signal from the integrated controller ICNT can be directly transmitted to the controllers CNT1 to CNTN of all of the battery packs MOD. In the above description, a reset signal or an input signal of an internal circuit is switched to high level/low level depending on the signal from the integrated controller ICNT. However, other signals may be controlled from outside in a similar manner.

Figure 1:
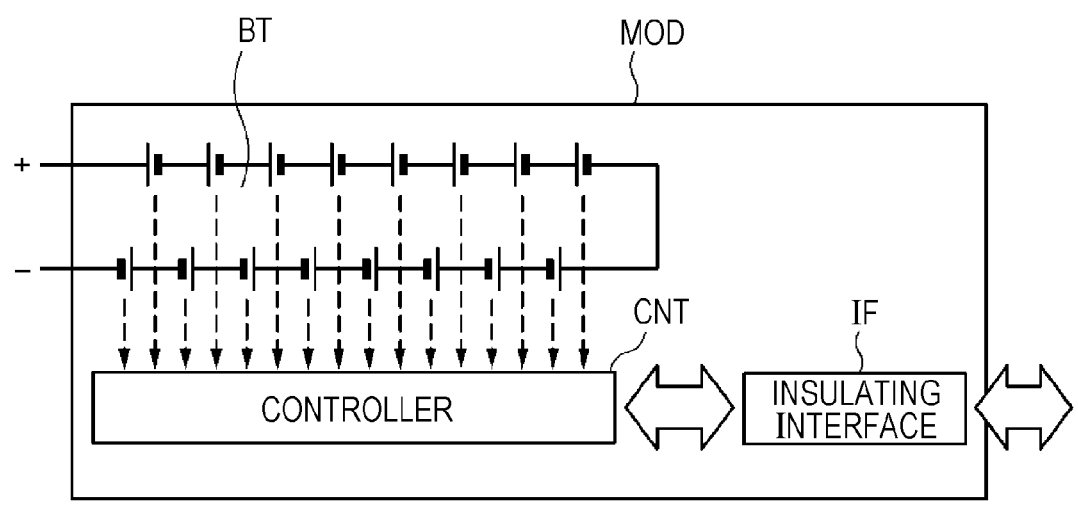
FIG. 1 is a block diagram of a battery pack of the related art.
Figure 2:
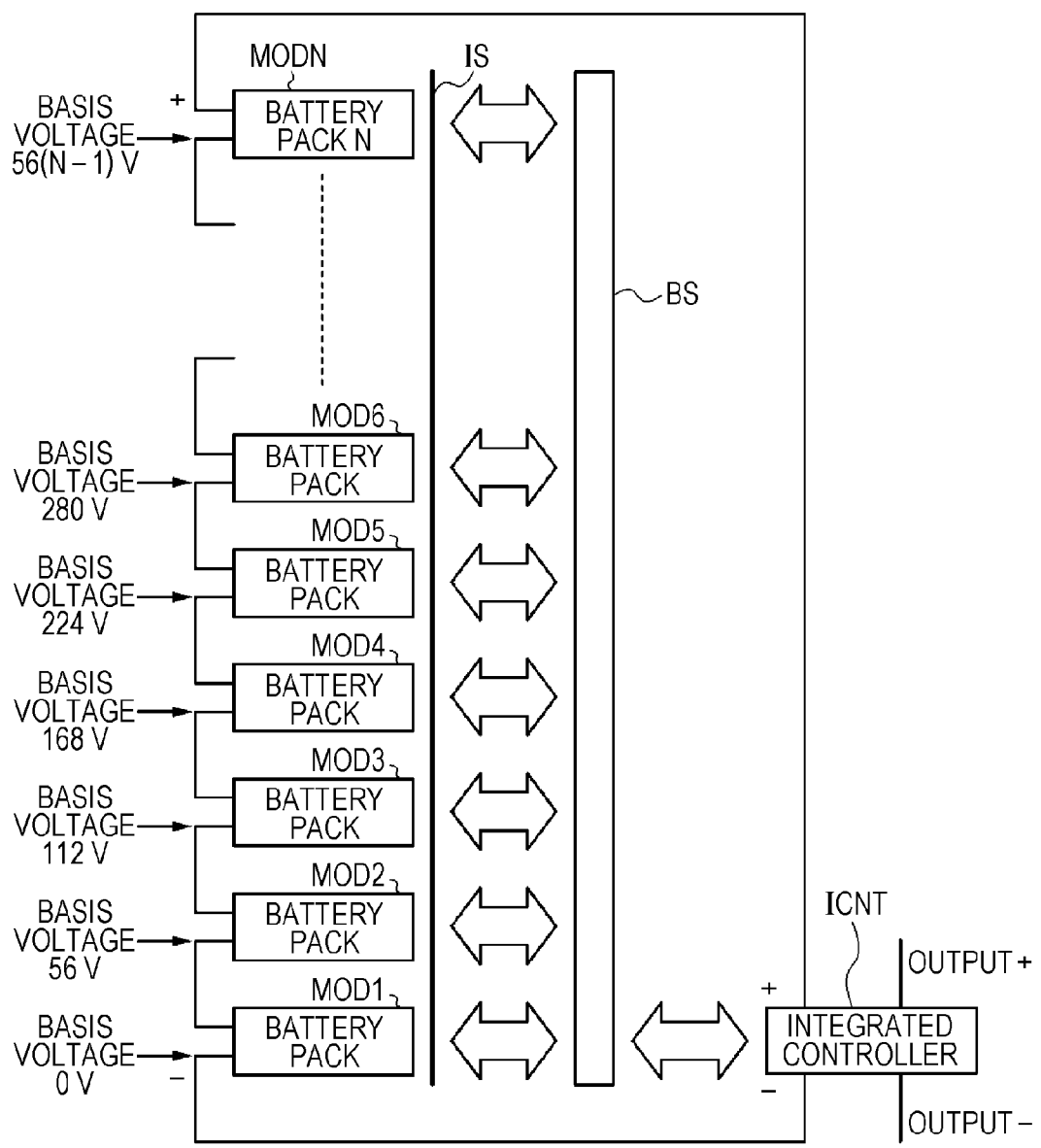
FIG. 2 is a block diagram of a battery system of the related art.
Figure 3:
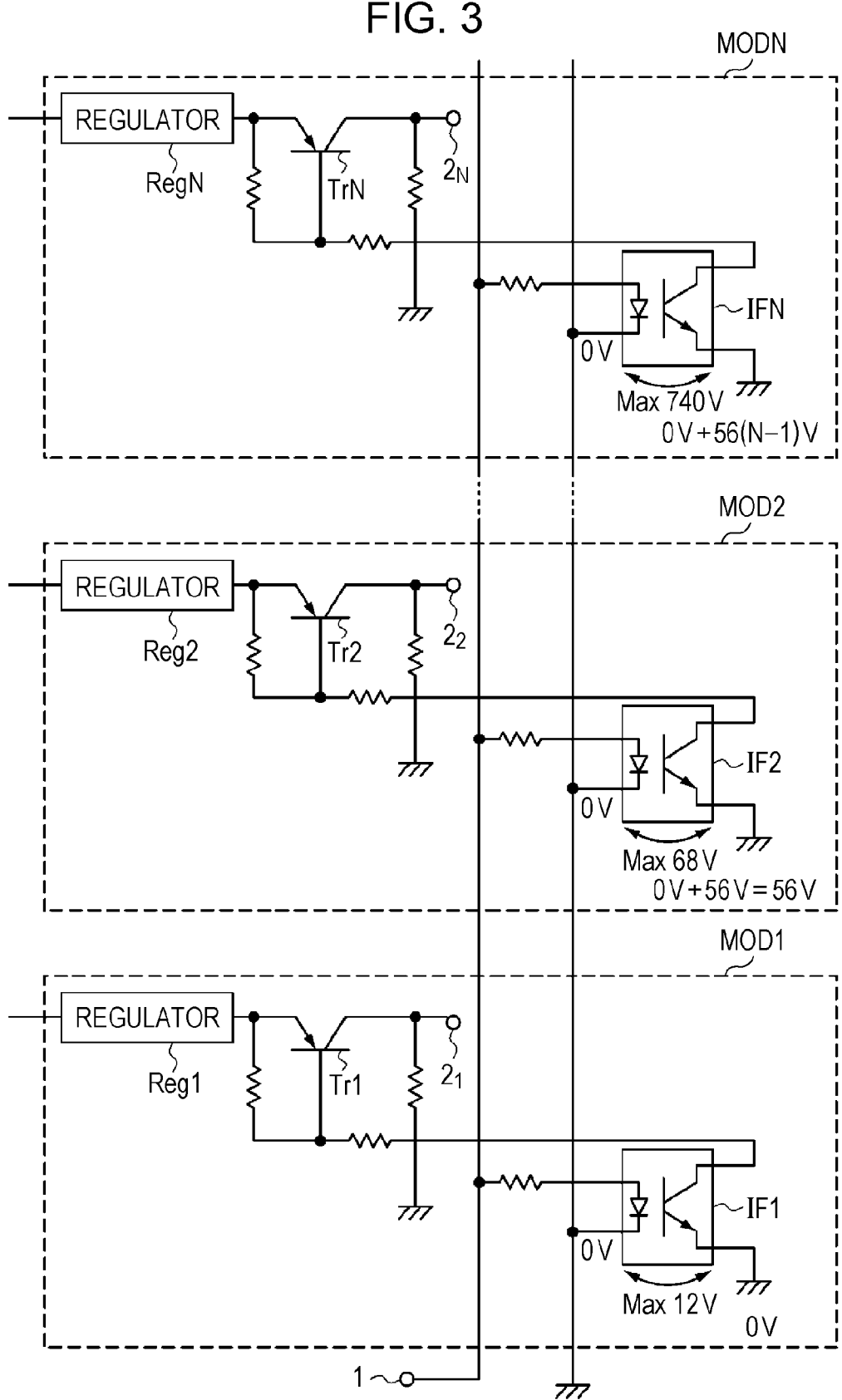
FIG. 3 is a connection diagram of a first example of a battery system of the related art.
Figure 13:
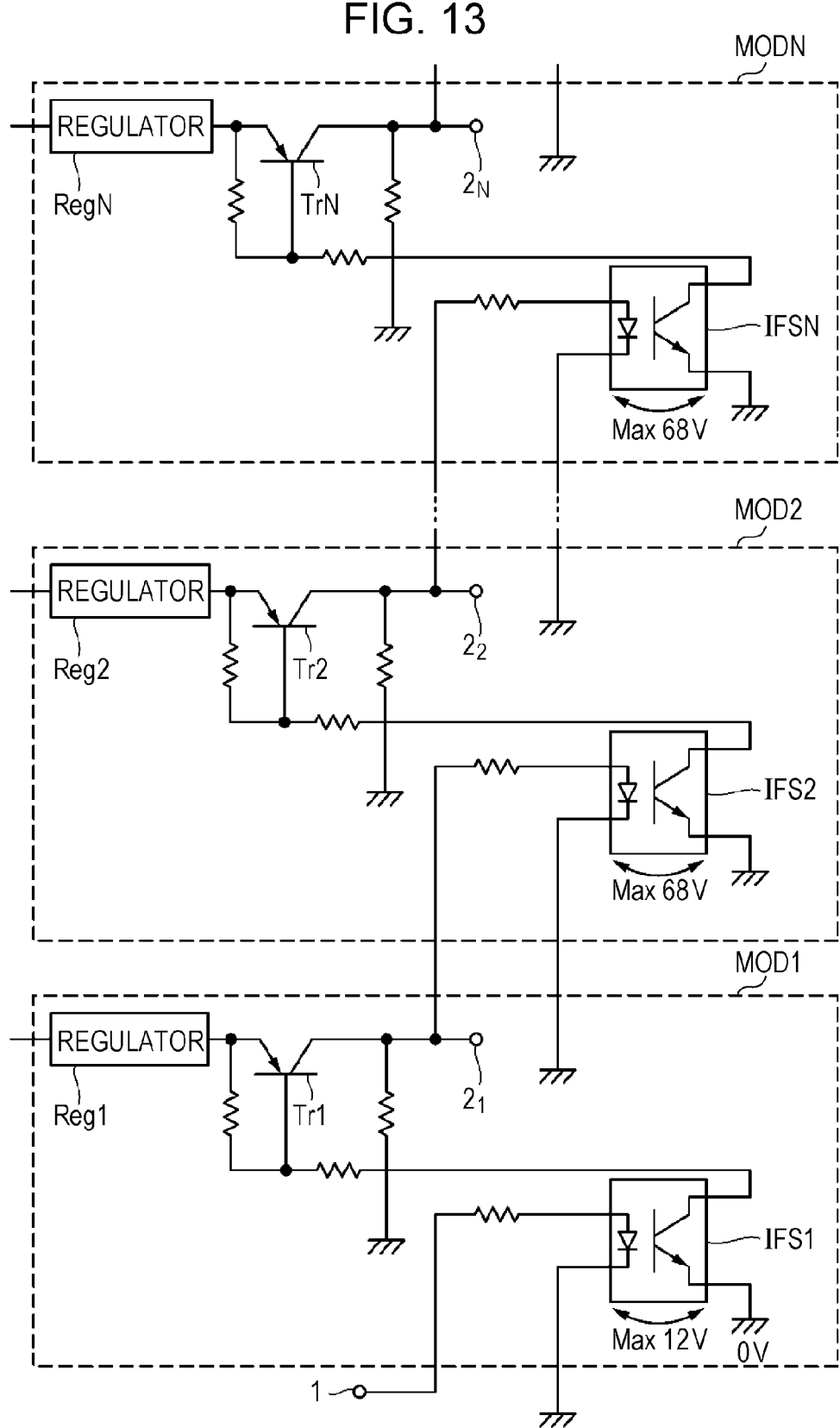
FIG. 13 is a connection diagram of the embodiment of the present invention.

The configuration of the embodiment is shown in FIG. 13. Elements corresponding to those of the first example of the related art which is described with reference to FIG. 3 are given the same reference characters as those of FIG. 3. The switching elements SW1 to SWN are respectively composed of the transistors Tr1 to TrN. The direct-current voltage Vcc is generated by each of the regulators Reg1 to RegN.

The regulator Reg1 generates a voltage of +12 V as a voltage of +Vcc from the voltage of 56 V of the battery unit BT1, and this voltage of +12 V is supplied to a collector of the phototransistor of the photocoupler IFS1 and is extracted by the output terminal $2_1$ via the transistor Tr1. The basis voltage (0 V) of the battery pack MOD1 is supplied to an emitter of the phototransistor. Accordingly, a voltage up to +12 V is applied between an input and an output of the photocoupler IFS1.

In the battery pack MOD2, the regulator Reg2 generates a voltage of 56 V+12 V=68 V from 56 V+56 V=112 V. Since the basis voltage (0 V) of the battery pack MOD1 in the lower order is supplied to a cathode of the light-emitting diode of the photocoupler IFS2, a voltage up to +68 V is applied to the photocoupler IFS2. At the output terminal $2_2$, an output signal of (Hi=12 V+56 V, Lo=56 V) is generated.

In the battery pack MODN in the highest order, the regulator RegN generates an output of 12 V+56(N−1) V from the voltage of 56 V+56(N−1) V. At the output terminal $2_N$, an output signal of (Hi=12 V+56(N−1) V, Lo=56(N−1) V) is generated. The basis voltage of 0+56(N−2) V of the battery pack MOD in the lower order is applied to a cathode of the light-emitting diode. In the case of N=14, this voltage becomes 672 V. Accordingly, a voltage up to +68 V is applied between an input and an output of the photocoupler IFSN.

Thus, in the embodiment, the maximum voltage which is applied to the photocoupler can be a voltage which is obtained by adding the signal voltage to the voltage of the battery unit of one battery pack (in the above example, 56 V+12 V=68 V). Accordingly, a use of a photocoupler which has an especially high breakdown voltage is not demanded. Further, the signal from the external integrated controller ICNT can be directly transmitted (that is, via no microprocessor) to the controller CNT of each of the battery packs MOD, thereby being able to prevent variance in the signal transmission time among the battery packs.

2. Another Embodiment of the Present Invention

In a battery pack MOD according to another embodiment of the present invention, a controller CNT is provided to a battery unit BT in which a plurality of battery cells, for example, 16 battery cells (for example, lithium-ion batteries) are connected in series, as is the case with the embodiment described first. The controller CNT outputs information of inside states such as a voltage, current, and a temperature of each of the cells of the battery unit BT. For example, one battery pack MOD outputs 16×3.5 V=56 V.

Further, similar to the configuration shown in FIG. 9, N pieces of battery packs MOD1 to MODN are connected in series. The battery packs MOD1 to MODN respectively include insulating interfaces which insulate among the battery packs MOD1 to MODN. Through photocouplers IFS1 to IFSN serving as the insulating interfaces, the controllers CNT of the battery packs MOD1 to MODN respectively communicates with the controller CNT in a higher order battery pack or a lower order battery pack or with an external integrated controller.

To the battery pack MOD1 in the lowest order, an integrated controller ICNT is connected. The integrated controller ICNT controls the whole of the battery system. The integrated controller ICNT receives information of the inside states of each of the battery packs MOD, and supplies and cuts off charging current and discharging current with respect to each of the battery packs MOD so as to control charge and discharge of each of the battery packs MOD. An output (N×56 V) of the series connection of the N pieces of the battery packs MOD is supplied to a load. In the example of N=14, an output is 14×56 V=784 V.

Figure 14:
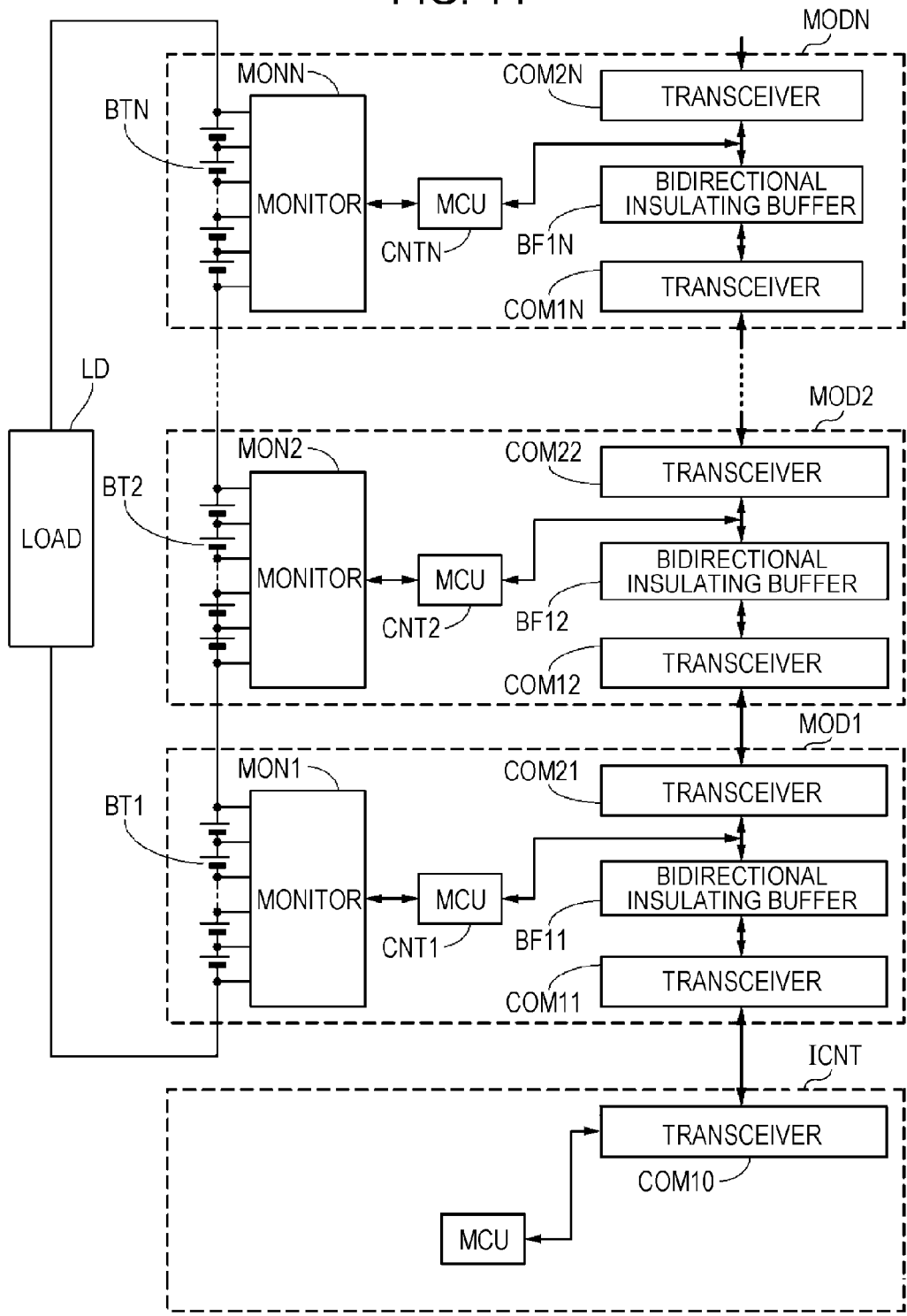
FIG. 14 is a block diagram of a battery system according to another embodiment of the present invention.
Figure 15:
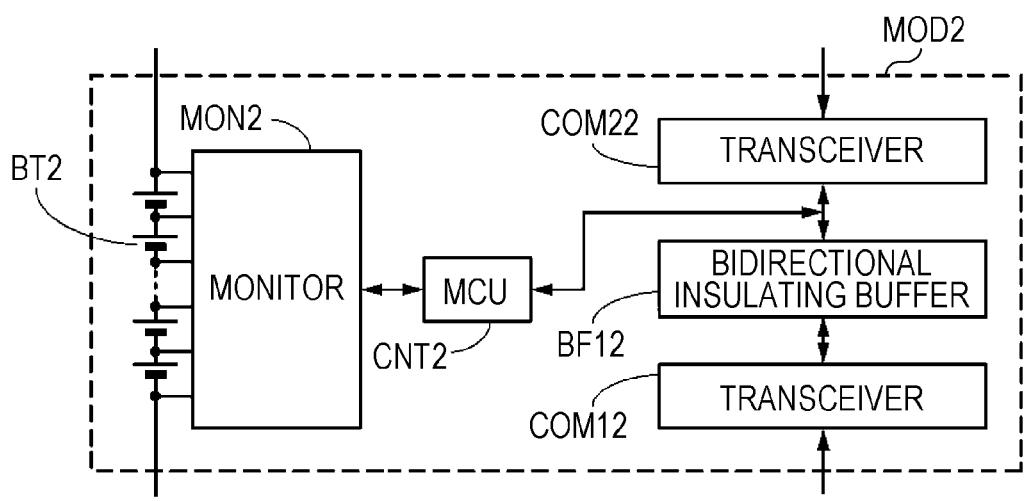
FIG. 15 is a block diagram of a battery pack according to the other embodiment of the present invention.

In the other embodiment, battery units BT1 to BTN of the N pieces of battery packs MOD are connected in series and a voltage of the series connection is supplied to a load LD, as shown in FIG. 14. For example, a voltage of the series connection of 16×N pieces of battery cells is supplied to the load LD. When one battery cell generates a voltage of 3.5 V and N=14, a voltage of 16×3.5 V×14=784 V is supplied to the load LD. FIG. 15 shows the configuration of a single battery pack, for example, the battery pack MOD2.

Voltages and current of the battery units BT1 to BTN of the battery packs MOD are respectively monitored by monitors MON1 to MONN. Temperatures of the battery units BT1 to BTN are also monitored respectively. Information of the inside states outputted by the monitors MON1 to MONN are respectively supplied to the controllers CNT1 to CNTN. The information of the inside states are transmitted to the integrated controller ICNT by a bidirectional serial communication between the controllers CNT1 to CNTN and the integrated controller ICNT.

Each of the battery packs MOD includes a structure for communicating with the battery pack (or the integrated controller) in the higher order or the lower order. Namely, the battery packs MOD1 to MODN respectively include bidirectional insulating buffers BF11 to BF1N as an insulating unit, communication transceivers COM11 to COM1N which are respectively connected to the lower order sides of the insulating buffers BF11 to BF1N, and communication transceivers COM21 to COM2N which are respectively connected to the higher order sides of the insulating buffers BF11 to BF1N. The communication transceiver COM11 of the battery pack MOD1 in the lowest order is connected with a communication transceiver COM10 of the integrated controller ICNT.

Figure 5A:
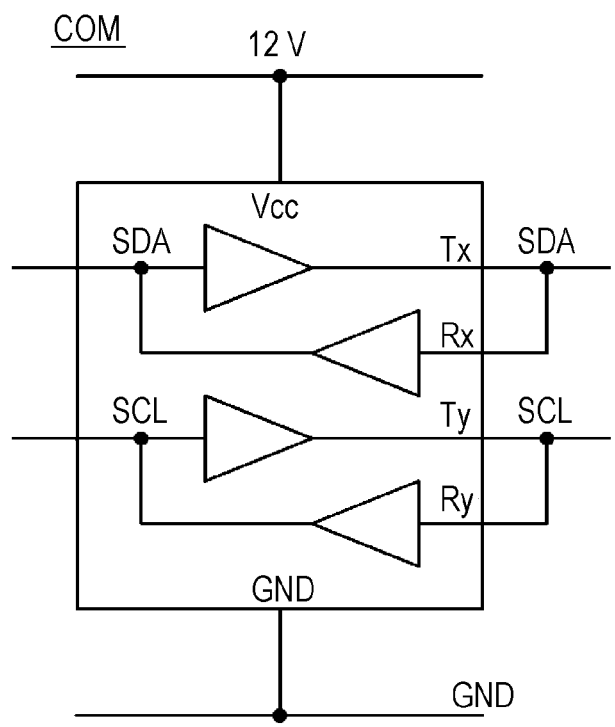
FIGS. 5A and 5B are block diagrams respectively illustrating a communication transceiver and an insulating buffer.
Figure 5B:
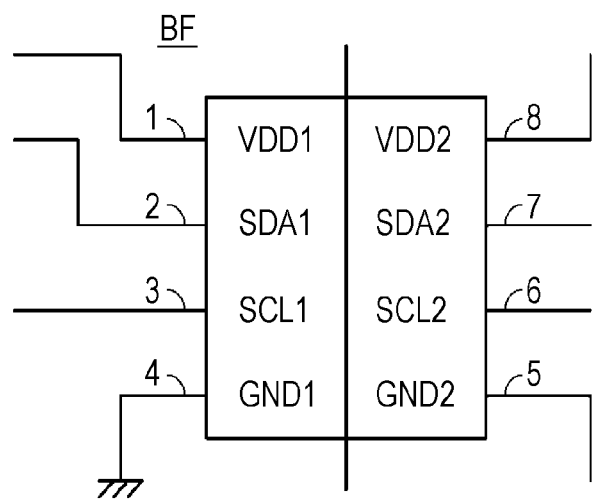

The controllers CNT1 to CNTN of the battery packs MOD are respectively connected between the insulating buffers BF11 to BF1N and the communication transceivers COM21 to COM2N. When serial communication of the I2C standard is employed, for example, the communication transceivers having the configuration which is described with reference to FIG. 5A are used. An I2C bus is a synchronous serial communication bus through which communication is performed with two signal lines of a serial clock (SCL) and bidirectional serial data (SDA). The integrated controller ICNT and the controller CNT of each of the battery packs MOD can individually communicate with each other by using an ID. Further, the ground GND line is provided. The insulating buffers having the configuration which is described with reference to FIG. 5B may be used.

Figure 4:
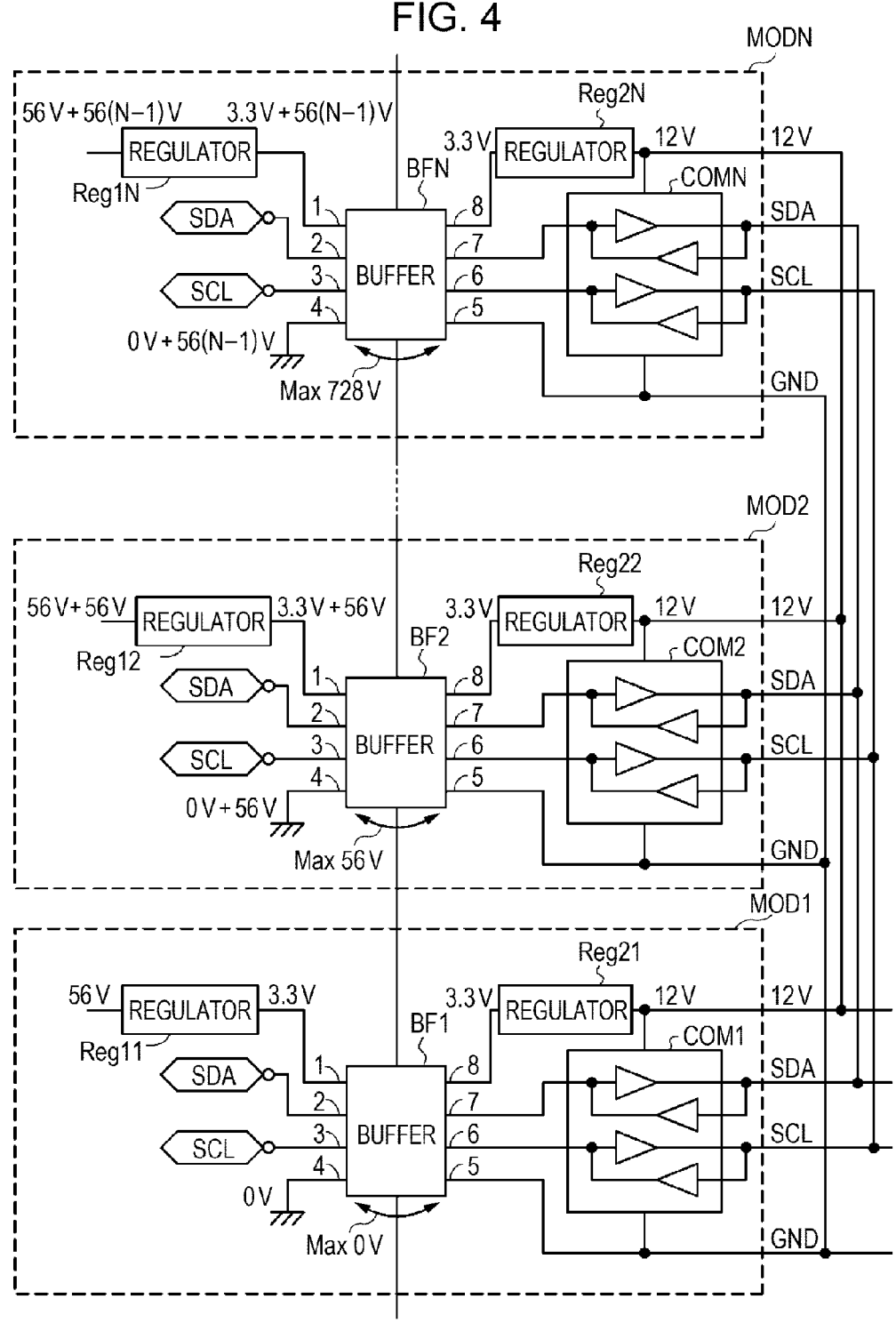
FIG. 4 is a connection diagram of a second example of a battery system of the related art.
Figure 16:
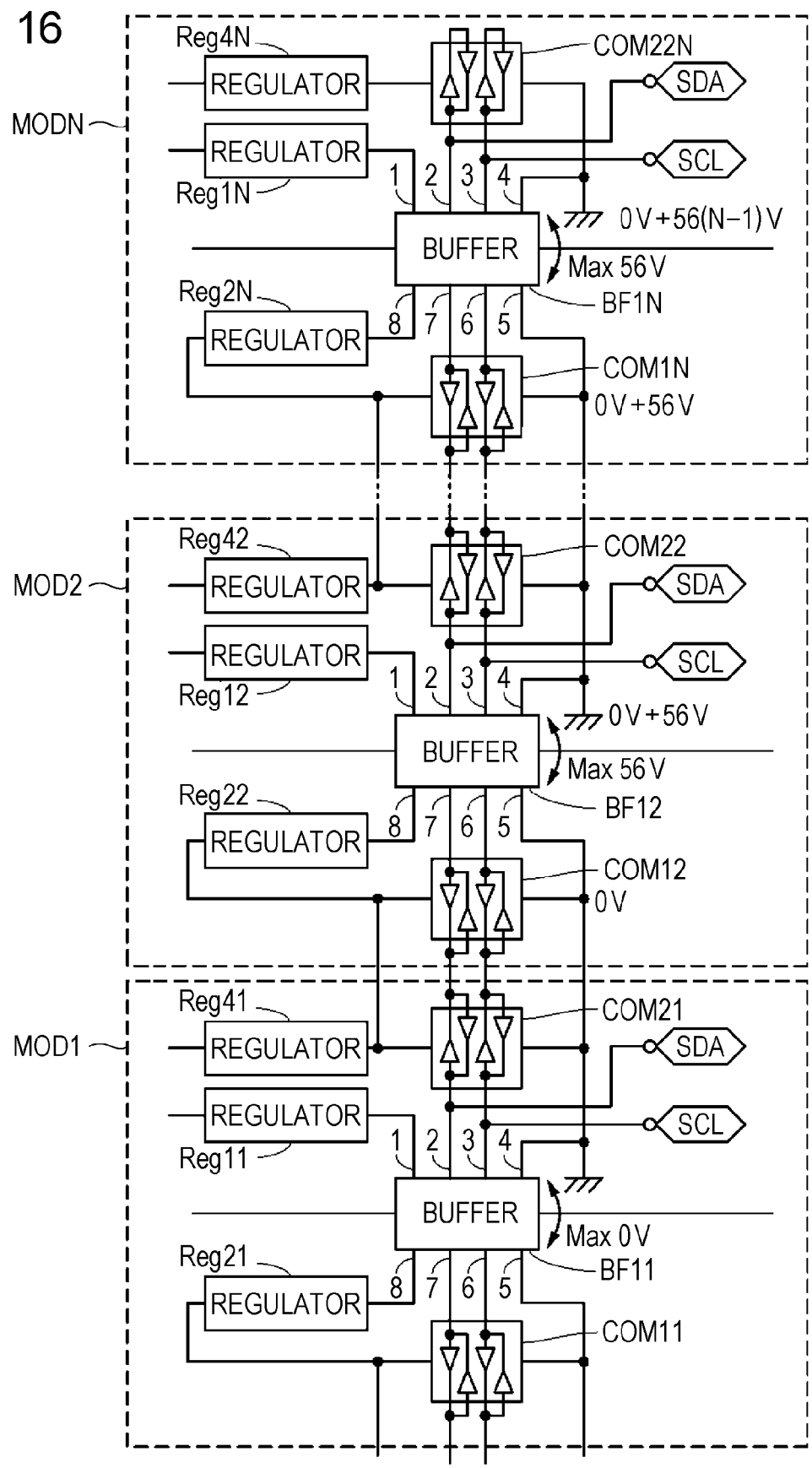
FIG. 16 is a connection diagram of the other embodiment of the present invention.

The configuration of the other embodiment is shown in FIG. 16. Elements corresponding to those of the second example of the related art which is described with reference to FIG. 4 are given the same reference characters as those of FIG. 4. A terminal on the lower order side of the communication transceiver COM11 of the battery pack MOD1 in the lowest order is connected with the communication transceiver COM10 of the integrated controller ICNT. A terminal of the higher order of the communication transceiver COM11 is connected with a terminal on the lower order side of the insulating buffer BF11.

A terminal on the lower order side of the communication transceiver COM21 is connected with a terminal on the higher order side of the insulating buffer BF11 and signal lines SDA and SCL are lead between this connection and the controller CNT1. A power source (for example, +12 V) of the communication transceiver COM11 is supplied from the integrated controller ICNT on the lower order side. The regulator Reg21 generates a power source of +3.3 V, for example, of the insulating buffer BF11 from the power source which is supplied. The regulator Reg11 generates a power source voltage (+3.3 V) of the insulating buffer BF11 from the power source voltage (+56 V) of the battery pack MOD1.

Further, a regulator Reg41 generates a power source (for example, +12 V) of the communication transceiver COM21 from the power source voltage (+56 V) of the battery pack MOD1. The voltage generated by the regulator Reg11 is supplied to the communication transceiver COM12 of the battery pack MOD2 in the higher order and supplied to the regulator Reg22 of the higher order. The battery pack MOD2 has the same configuration as that of the battery pack MOD1.

In the insulating buffer BF11 of the battery pack MOD1, both of an output voltage of the regulator Reg11 and an output voltage of the regulator Reg21 are 3.3 V and therefore a voltage applied to the insulating buffer BF11 is up to 0 V. In the battery pack MOD2, the power source voltage of +3.3 V which is generated by the regulator Reg22 and the power source voltage of 3.3 V+56 V which is generated by the regulator Reg12 are applied to the insulating buffer BF12. Accordingly, a voltage applied to the insulating buffer BF12 is up to 56 V.

In the battery pack MODN in the highest order, the power source voltage of 3.3 V+56(N−2) V which is generated by the regulator Reg2N and the power source voltage of 3.3 V+56 (N−1) V which is generated by the regulator Reg1N are applied to the insulating buffer BF1N. Accordingly, a voltage applied to the insulating buffer BF1N is up to 56 V.

Thus, in the other embodiment, the maximum voltage which is applied to the insulating buffer serving as an insulating unit can be a voltage (56 V, in the above-described example) of the battery unit of one battery pack. Accordingly, a use of an insulating buffer which has an especially high breakdown voltage is not demanded. Further, a signal from the external integrated controller ICNT can be directly transmitted (that is, via no microprocessor) to the controller CNT of each of the battery packs MOD, thereby being able to prevent variance in signal transmission time among the battery packs.

3. Still Another Embodiment of the Present Invention

In a battery pack MOD according to still another embodiment of the present invention, a controller CNT is provided to a battery unit BT in which a plurality of battery cells, for example, 16 battery cells (for example, lithium-ion batteries) are connected in series, as is the case with the embodiment described first and the embodiment described second. The controller CNT outputs information of inside states such as a voltage, current, and a temperature of each of the cells of the battery unit BT. For example, one battery pack MOD outputs 16×3.5 V=56 V.

Further, similar to the configuration shown in FIG. 9, N pieces of battery packs MOD1 to MODN are connected in series. The battery packs MOD1 to MODN respectively include insulating interfaces which insulate among the battery packs MOD1 to MODN. Via photocouplers IFS1 to IFSN serving as the insulating interfaces, power sources of the battery packs MOD are respectively controlled.

To the battery pack MOD1 in the lowest order, an integrated controller ICNT is connected. The integrated controller ICNT controls the whole of the battery system. The integrated controller ICNT receives information of the inside states of each of the battery packs MOD, and supplies and cuts off charging current and discharging current with respect to each of the battery packs MOD so as to control charge and discharge of each of the battery packs MOD. An output (N×56 V) of the series connection of the N pieces of the battery packs MOD is supplied to a load. In the example of N=14, an output is 14×56 V=784 V.

Figure 17:
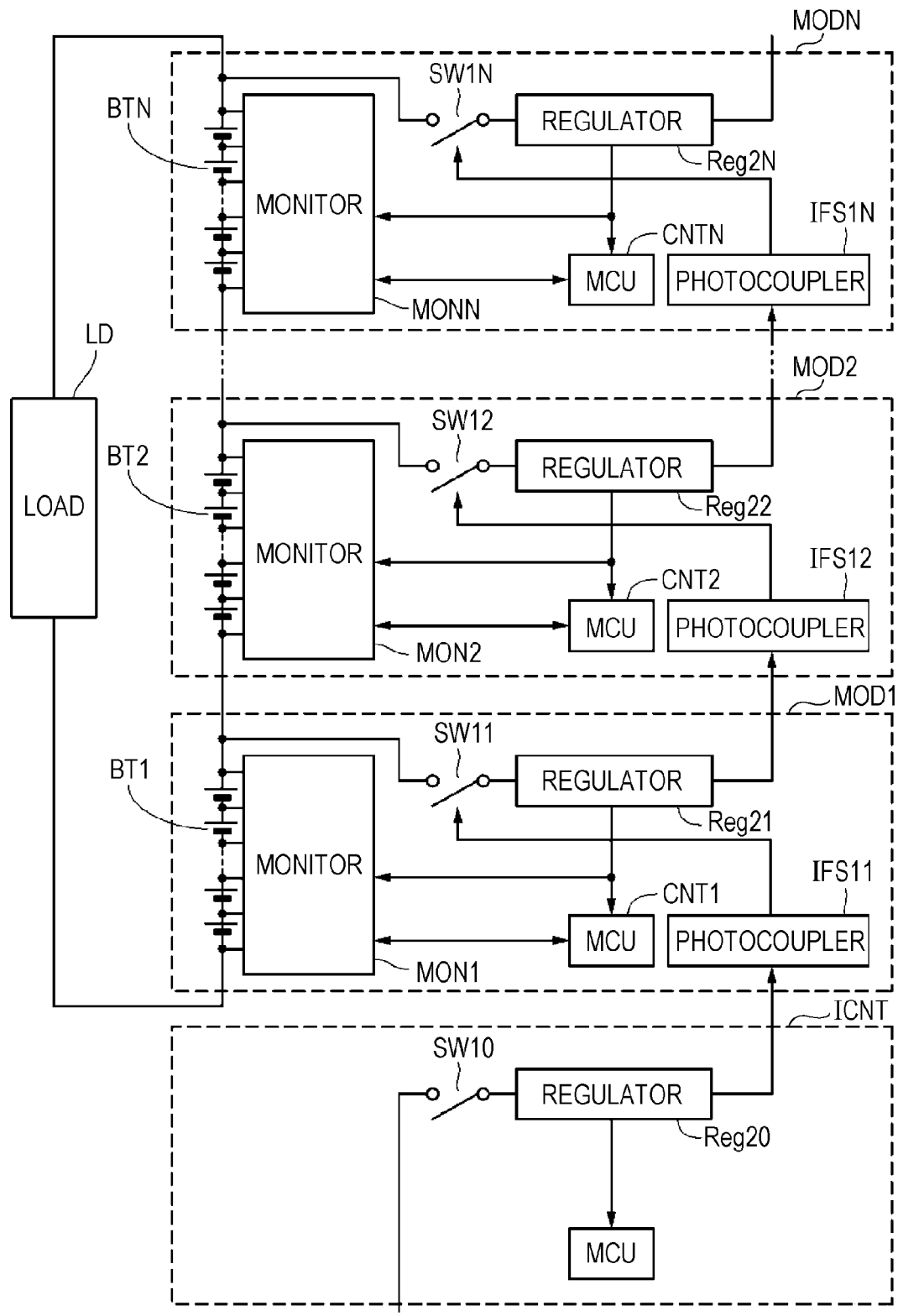
FIG. 17 is a block diagram of a battery system according to still another embodiment of the present invention.
Figure 18:
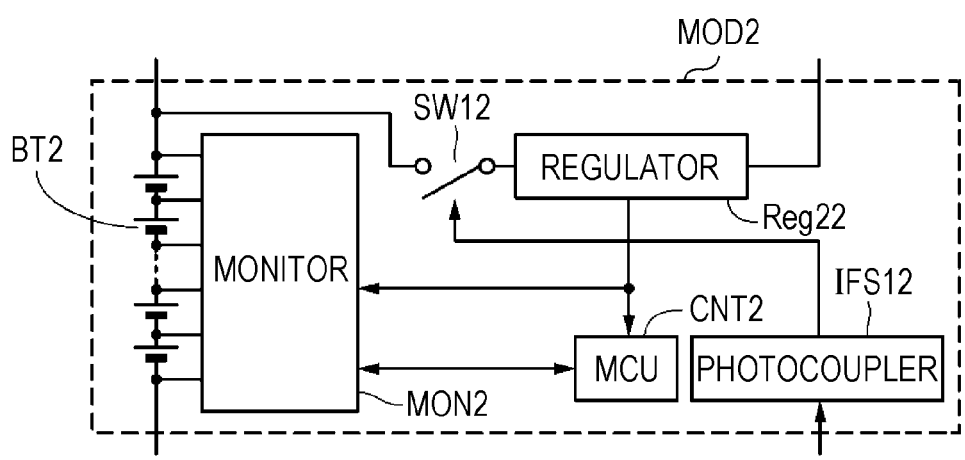
FIG. 18 is a block diagram of a battery pack according to the still other embodiment of the present invention.

In the still other embodiment, battery units BT1 to BTN of the N pieces of battery packs MOD are connected in series and a voltage of the series connection is supplied to a load LD, as shown in FIG. 17. For example, a voltage of the series connection of 16×N pieces of battery cells is supplied to the load LD. When one battery cell generates a voltage of 3.5 V and N=14, a voltage of 16×3.5 V×14=784 V is supplied to the load LD. FIG. 18 shows the configuration of a single battery pack, for example, the battery pack MOD2.

Voltages and current of the battery units BT1 to BTN of the battery packs MOD are respectively monitored by monitors MON1 to MONN. Temperatures of the battery units BT1 to BTN are also monitored respectively. Information of the inside states outputted by the monitors MON1 to MONN are respectively supplied to the controllers CNT1 to CNTN. The information of the inside states are transmitted to the integrated controller ICNT by a bidirectional serial communication between the controllers CNT1 to CNTN and the integrated controller ICNT.

The integrated controller ICNT is provided with a power switch SW10. When the power switch SW10 is turned on, an external power source input is supplied to a regulator Reg20. The regulator Reg20 generates a power-on signal of a predetermined voltage, for example, a power-on signal of +12 V. When the power switch SW is off, an output voltage of the regulator Reg20 is 0 V.

An output signal of the regulator Reg20 is supplied as a control signal to a switching element SW11 via a photocoupler IFS11 serving as an isolator of the battery pack MOD1. The switching element SW11 supplies a voltage (for example, +56 V) of the battery unit BT1 to the regulator Reg21. When the switching element SW11 is on, the regulator Reg21 generates a predetermined power source voltage, for example, a power source voltage of +12 V. The voltage generated by the regulator Reg21 is supplied as the power source voltage to the monitor MON1 and the controller CNT1. Further, the voltage generated by the regulator Reg21 is supplied to a switching element SW12 via a photocoupler IFS12 of the battery pack MOD2 in the higher order.

Thus, the power-on signal from the integrated controller ICNT is sequentially transmitted from the battery pack on the lower order side to the battery pack on the higher order side up to the battery pack MODN in the highest order. Accordingly, power sources of the respective battery packs are sequentially turned on/off in an interlocking manner.

Figure 6:
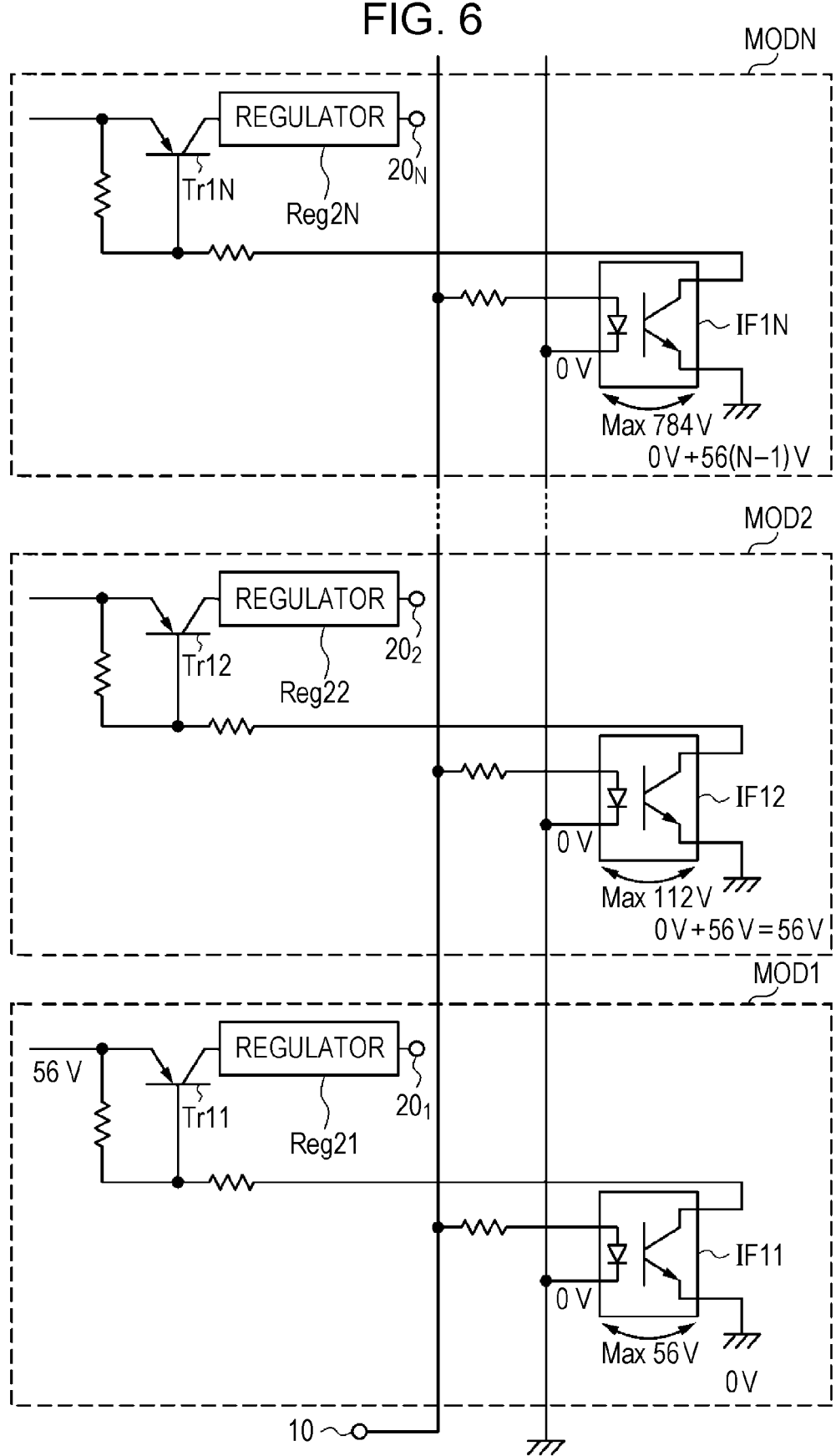
FIG. 6 is a connection diagram of a third example of a battery system of the related art.
Figure 19:
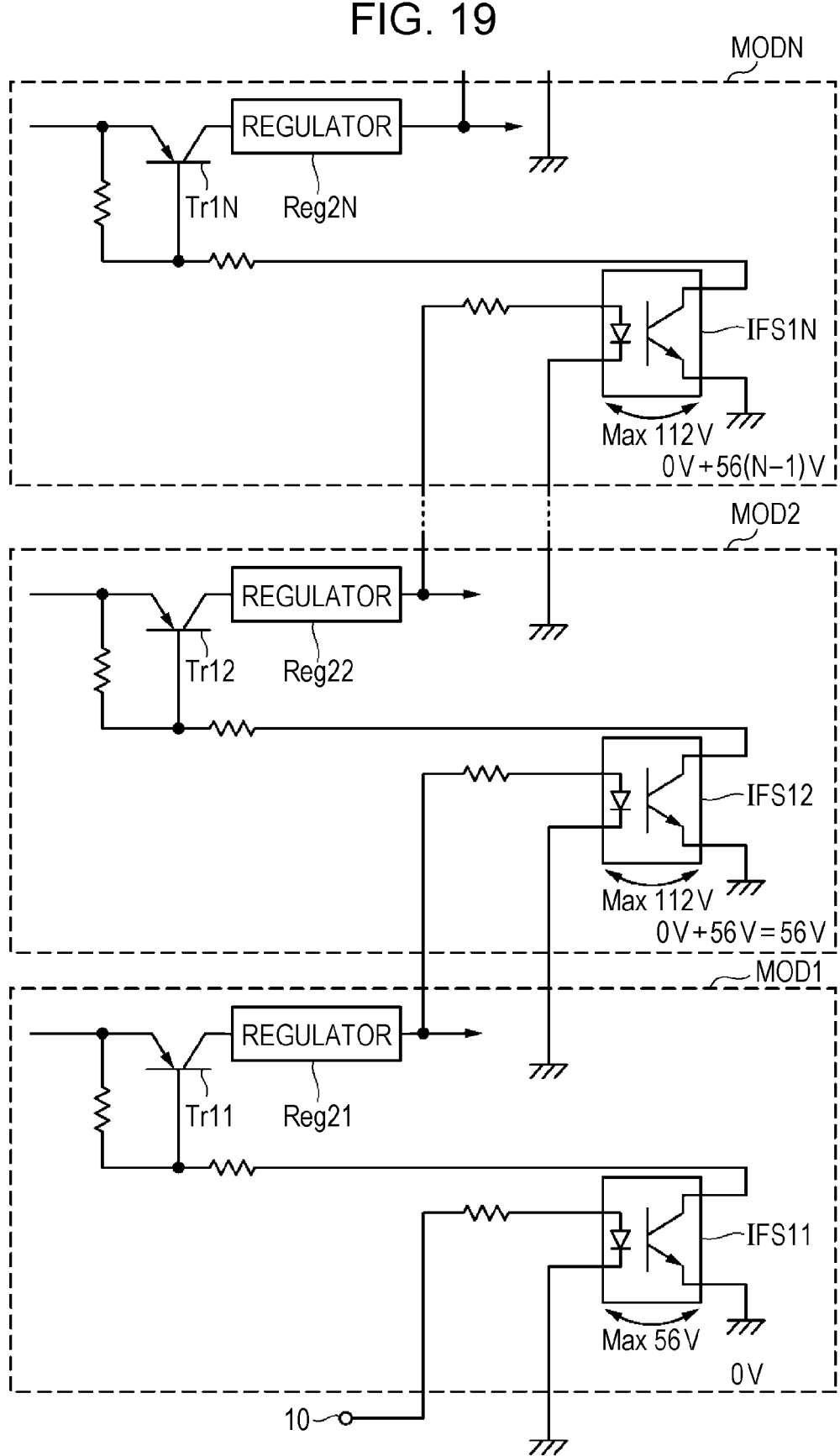
FIG. 19 is a connection diagram of the still other embodiment of the present invention.

The configuration of the still other embodiment is shown in FIG. 19. Elements corresponding to those of the third example of the related art which is described with reference to FIG. 6 are given the same reference characters as those of FIG. 6. The switching elements SW11 to SW1N are respectively composed of switching transistors Tr11 to Tr1N and the switching transistors Tr11 to Tr1N are respectively controlled by outputs of the photocouplers IFS. A power-on signal is inputted into a light-emitting diode of the photocoupler IFS11 of the battery pack MOD1 in the lowest order from the integrated controller ICNT.

Voltages of the battery units BT1 to BTN of the battery packs MOD are respectively supplied to emitters of the transistors Tr11 to Tr1N and voltages of collectors are respectively supplied to the regulators Reg21 to Reg2N. Power-on signals of a predetermined voltage from the regulators Reg are respectively extracted. The power-on signals are respectively supplied to the controllers CNT1 to CNTN and the monitors MON1 to MONN of the battery packs MOD. The controllers CNT which have received the power-on signals respectively start operations of the battery packs MOD.

In the battery pack MOD1, the voltage of 56 V is supplied from the battery pack BT to the emitter of the transistor Tr11. When a low level signal is supplied to a base from the photocoupler IFS11, the transistor Tr11 is turned on. The voltage of 56 V is inputted into the regulator Reg21 via the transistor Tr11 and a power-on signal of 12 V is outputted to an output terminal. This power-on signal is supplied to a light-emitting diode of the photocoupler IFS of the battery pack MOD on the higher order side.

Into the input terminal 10, a power-on signal of 12 V is inputted in power-on time, and a power-on signal of 0 V is inputted in power-off time. When the power-on signal is inputted into the photocoupler IFS11, the light-emitting diode of the photocoupler IFS11 emits light in the power-on time and a phototransistor is turned on. Consequently, an output of the photocoupler IFS11 becomes low level, for example, 1 V. In this case, the transistor Tr11 is turned on. On the other hand, since the light-emitting diode does not emit light in power-off time, the output of the photocoupler IFS11 becomes high level, for example, 56 V. In this case, the transistor Tr11 is not turned on and a power-on signal is not generated. In the battery pack MOD1, the maximum value of the voltage which is applied between an input and an output of the photocoupler IFS11 is 56 V.

In the battery pack MOD2, the basis voltage is 56 V and the voltage from the battery unit BT is 56 V+56 V=112 V. Accordingly, the maximum value of the voltage applied between an input and an output of the photocoupler IFS12 is 112 V. In the battery pack MODN in the highest order, the basis voltage is 0 V+56(N−1) V and the voltage of the battery unit BT is 56 V+56(N−1) V. A forward direction voltage drop of the light-emitting diode is set to be 2 V and a saturation voltage of the phototransistor is set to be 1 V. A voltage of an anode of the light-emitting diode of the photocoupler IFS1N becomes 2+56(N−2) V in ON time and becomes 0+56(N−2) V in OFF time. A collector voltage of the phototransistor becomes 1+56(N−1) V in ON time and becomes 56+56(N−1) V in OFF time. Accordingly, the maximum value of the voltage applied between an input and an output of the photocoupler IFS1N is up to 112 V in a case of N=14.

Thus, in the still other embodiment, the maximum voltage which is applied to the photocoupler can be a voltage of the battery units of two battery packs (in the above-described example, 56 V+56 V=112 V). Accordingly, a use of a photocoupler which has an especially high breakdown voltage is not demanded. Further, the power-on signal from the external integrated controller ICNT can be directly transmitted (that is, via no microprocessor) to the controller CNT of each of the battery packs MOD, thereby being able to prevent variance in the signal transmission time among the battery packs.

4. Yet Another Embodiment of the Present Invention

In a battery pack MOD according to yet another embodiment of the present invention, a controller CNT is provided to a battery unit BT in which a plurality of battery cells, for example, 16 battery cells (for example, lithium-ion batteries) are connected in series, as is the case with the embodiment described first, the embodiment described second, and the embodiment described third. The controller CNT outputs information of inside states such as a voltage, current, and a temperature of each of the cells of the battery unit BT. For example, one battery pack MOD outputs 16×3.5 V=56 V.

Further, similar to the configuration shown in FIG. 9, N pieces of battery packs MOD1 to MODN are connected in series. The battery packs MOD1 to MODN respectively include insulating interfaces which insulate among the battery packs MOD1 to MODN. Via photocouplers IFS1 to IFSN serving as the insulating interfaces, power sources of the battery packs MOD are respectively controlled.

To the battery pack MOD1 in the lowest order, an integrated controller ICNT is connected. The integrated controller ICNT controls the whole of the battery system. The integrated controller ICNT receives information of the inside states of each of the battery packs MOD, and supplies and cuts off charging current and discharging current with respect to each of the battery packs MOD so as to control charge and discharge of each of the battery packs MOD. An output (N×56 V) of the series connection of the N pieces of the battery packs MOD is supplied to a load. In the example of N=14, an output is 14×56 V=784 V.

Figure 20:
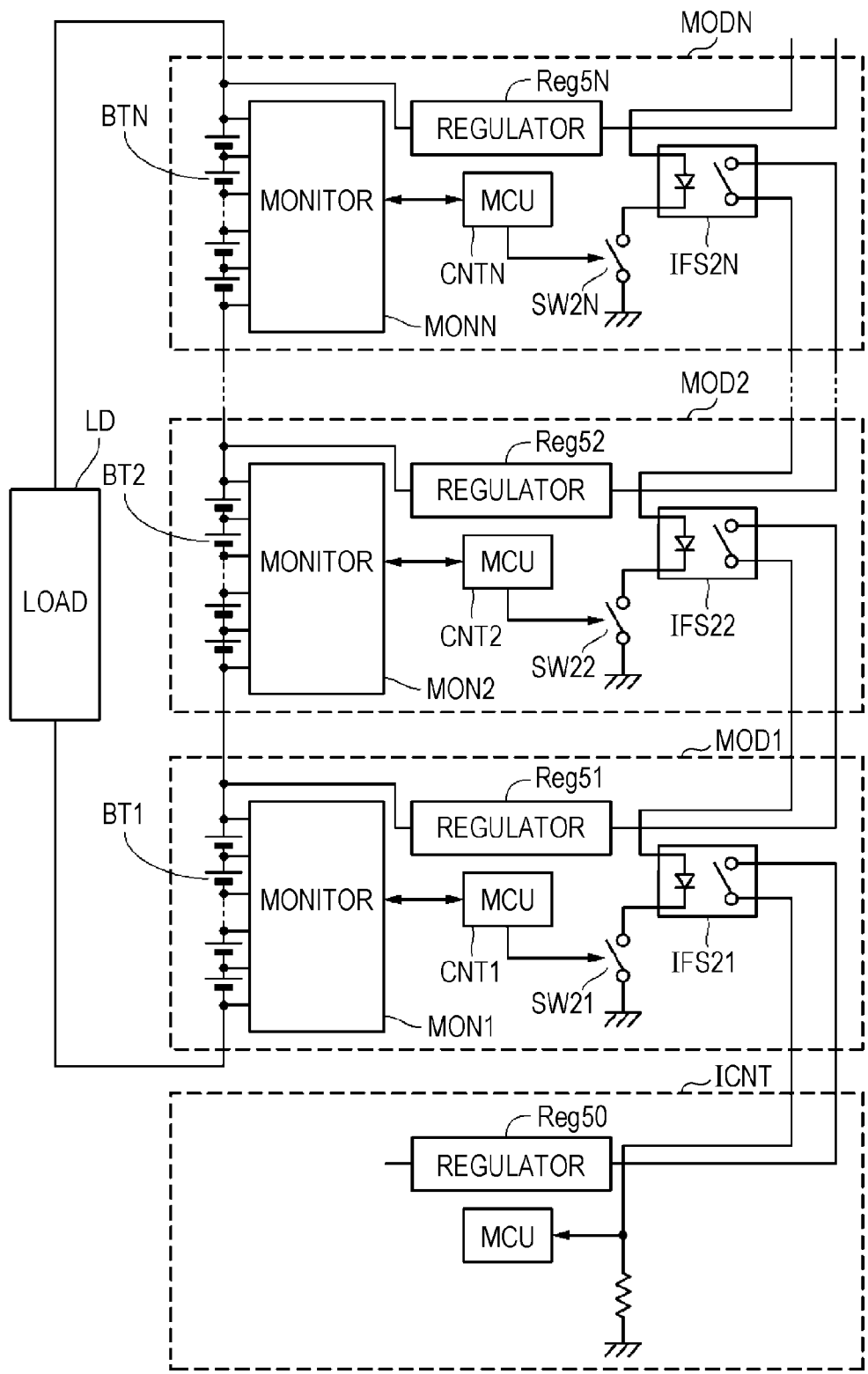
FIG. 20 is a block diagram of a battery system according to yet another embodiment of the present invention.
Figure 21:
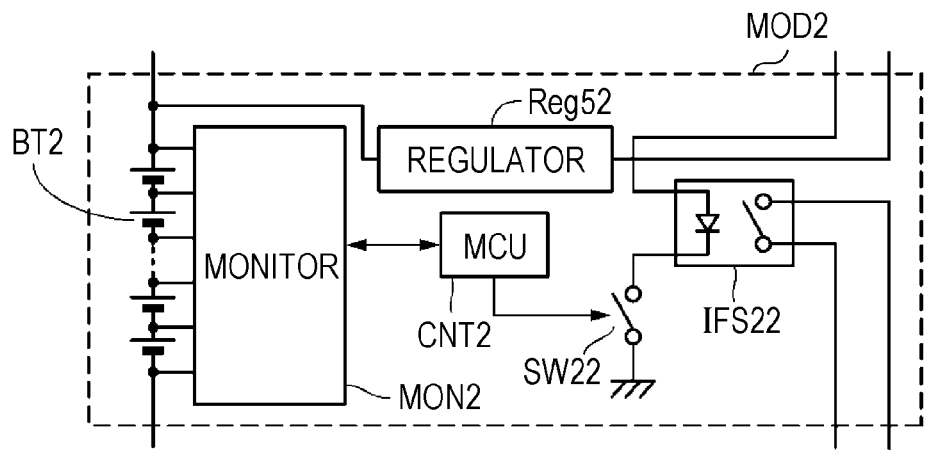
FIG. 21 is a block diagram of a battery pack according to the yet other embodiment of the present invention.

In the yet other embodiment, battery units BT1 to BTN of the N pieces of battery packs MOD are connected in series and a voltage of the series connection is supplied to a load LD, as shown in FIG. 20. For example, a voltage of the series connection of (16×N) pieces of battery cells is supplied to the load LD. When one battery cell generates a voltage of 3.5 V and N=14, a voltage of 16×3.5 V×14=784 V is supplied to the load LD. FIG. 21 shows the configuration of a single battery pack, for example, the battery pack MOD2.

Voltages and current of the battery units BT1 to BTN of the battery packs MOD are respectively monitored by monitors MON1 to MONN. Temperatures of the battery units BT1 to BTN are also monitored respectively. Information of the inside states outputted by the monitors MON1 to MONN are respectively supplied to the controllers CNT1 to CNTN. The information of the inside states are serially transmitted to the integrated controller ICNT from the controllers CNT1 to CNTN.

A switching element SW21 is controlled by the controller CNT1 of the battery pack MOD1 in the lowest order. The controller CNT1 receives information of the inside states from the monitor MON1 and supplies a low level signal to the switching element SW21 when troubles (overcharge, over discharge, and a problem during charging) occur. The switching element SW21 is in an ON state when no trouble occurs, and the switching element SW21 is turned off by the low level signal which indicates troubles and is supplied from the controller CNT1. In other battery packs MOD2 to MODN as well, switching elements SW22 to SW2N are respectively controlled by outputs of the controllers CNT2 to CNTN in a similar manner.

Isolators are respectively composed of photocouplers IFS21 to IFS2N. A regulator Reg50 of the integrated controller ICNT generates a predetermined direct-current voltage, for example, a direct-current voltage of +12 V. A phototransistor and a capacitor of the photocoupler IFS21 of the battery pack MOD1 in the lowest order are inserted between a supply terminal of this voltage and a ground of the integrated controller ICNT. A terminal voltage of the capacitor is supplied to a microprocessor of the integrated controller ICNT. The terminal voltage of the capacitor is extracted as an output of a state signal of the battery packs MOD1 to MODN.

A switching element SW21 is inserted between a cathode of a light-emitting diode and a ground of the photocoupler IFS21. An anode of the light-emitting diode is connected to an output (emitter) side of a phototransistor of the battery pack MOD2 in the higher order. To an input (collector) side of the phototransistor, a voltage which is generated by a regulator Reg51 of the battery pack MOD1 is supplied.

Thus, the switching elements SW21 to SW2N which are serially controlled by a state signal are connected to cathodes of light-emitting diodes of the photocouplers IFS21 to IFS2N of the respective battery packs MOD in series, and direct-current voltages which are generated by the regulators Reg51 to Reg5N are supplied to anodes of the light-emitting diodes via phototransistors of the photocouplers in higher orders. These direct-current voltages are generated by the battery packs MOD themselves with their regulators.

Accordingly, in a normal state, the switching elements SW21 to SW2N of all of the battery packs MOD are on and a high level signal is inputted into the microprocessor of the integrated controller ICNT. When a trouble occurs in any of the battery packs MOD, then the state signal becomes low level, and the switching element is turned off, the light-emitting diode of the photocoupler does not emit light and a low level signal is inputted into the microprocessor of the integrated controller ICNT. Accordingly, the occurrence of the trouble can be notified to the integrated controller ICNT.

Figure 7:
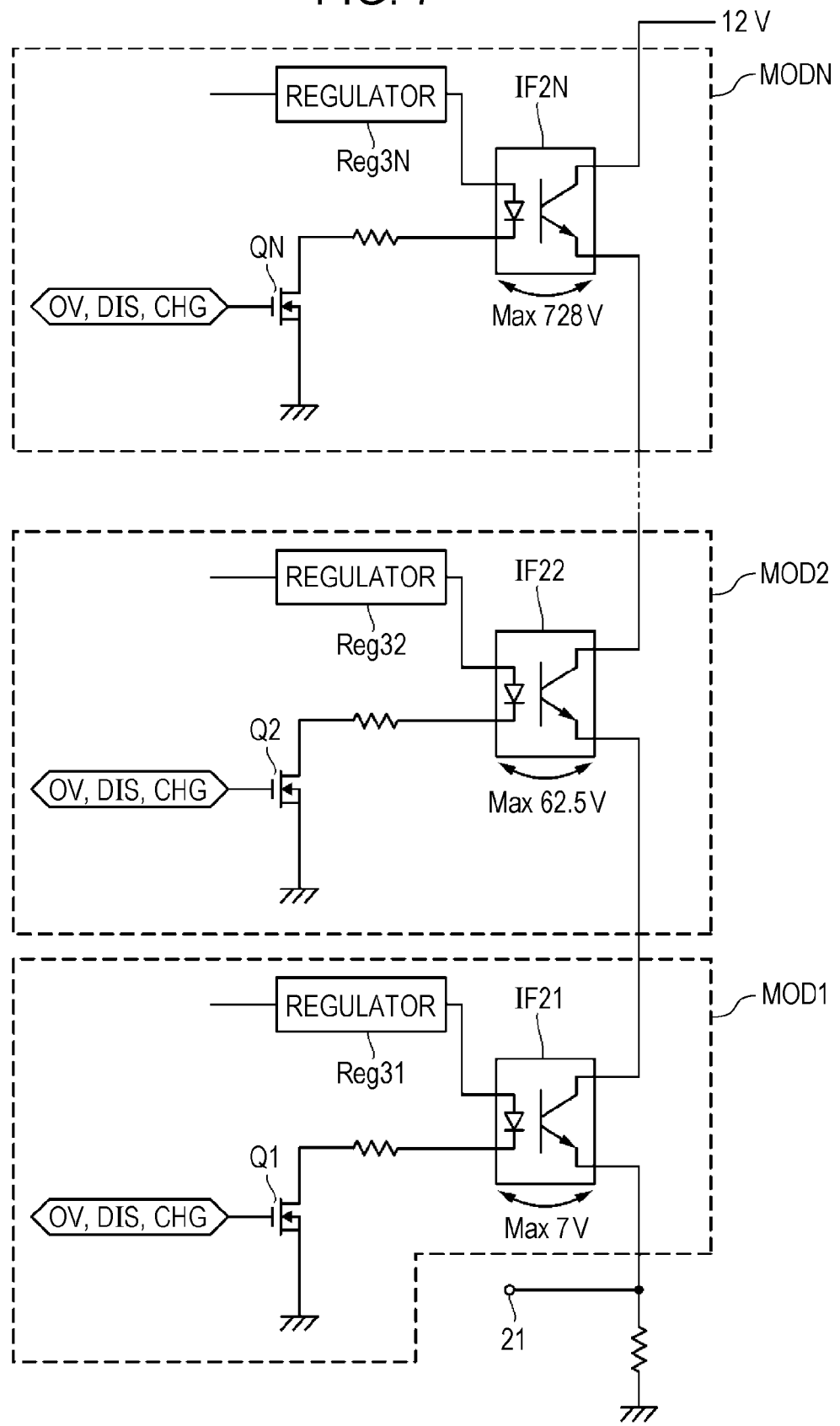
FIG. 7 is a connection diagram of a fourth example of a battery system of the related art.
Figure 22:
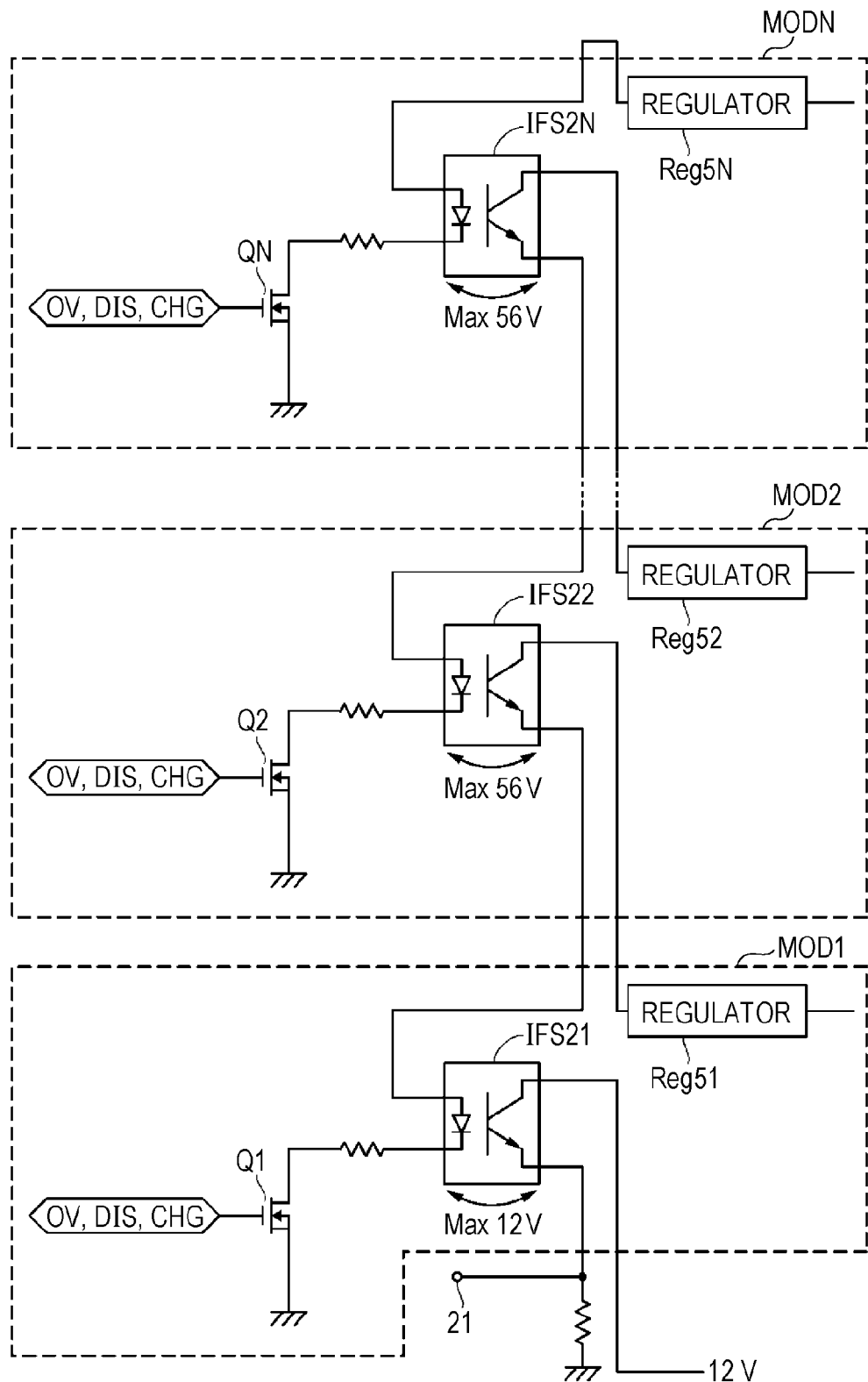
FIG. 22 is a connection diagram of the yet other embodiment of the present invention.

The configuration of the yet other embodiment is shown in FIG. 22. Elements corresponding to those of the fourth example of the related art which is described with reference to FIG. 7 are given the same reference characters as those of FIG. 7. As the state signal, OV, DIS, and CHG are shown. The state signal OV becomes low level when the battery unit BT of the battery pack MOD is overcharged. The state signal DIS becomes low level when the battery unit BT of the battery pack MOD is overcharged. The state signal CHG becomes low level when a problem occurs while charging the battery unit BT of the battery pack MOD.

The switching elements SW21 to SW2N are respectively composed of MOSFETs Q1 to QN and the MOSFETs Q1 to QN are controlled by the state signal (any of the state signals OV, DIS, and CHG). The MOSFETs Q1 to QN are n-channel type, so that the MOSFETs Q1 to Qn are turned on when a positive voltage is applied between a gate and a source.

Drains of the MOSFETs Q are respectively connected with cathodes of the light-emitting diodes of the photocouplers IFS21 to IFS2N via capacitors. Anodes of the light-emitting diodes are connected with emitters of the phototransistors IFS2 of the higher order. To collectors of the phototransistors of the photocouplers IFS21 to IFS2N, direct-current voltages which are respectively generated by the regulators Reg50 to Reg5(N−1) in the lower order are respectively supplied. A resistor is inserted between an emitter of the phototransistor of the photocoupler IFS21 of the battery pack MOD1 in the lowest order and a ground and the output terminal 21 is led out from a connecting point of the emitter and the resistor. A state signal is supplied to the microprocessor of the integrated controller ICNT from this output terminal 21.

In any of the battery packs MOD1 to MODN, when a state signal becomes low level, the MOSFET Q to which the state signal is supplied is turned from on to off. For example, in the battery pack MOD2, when the state signal becomes low level, the MOSFET Q2 is turned from on to off. Accordingly, power feeding with respect to the light-emitting diode of the photocoupler IFS22 is stopped and the phototransistor of the photocoupler IFS22 is turned off. As a result, the light-emitting diode of the photocoupler IFS21 does not emit light and the state signal (the output terminal 21) which is transmitted from the photocoupler IFS21 to the integrated controller ICNT becomes low level.

A voltage applied to the photocoupler of each of the battery packs MOD is described by taking the battery packs MOD1 and MOD2 as an example. A forward direction voltage drop of the light-emitting diode is set to be 2 V and a saturation voltage of the phototransistor is set to be 1 V. The regulator Reg51 generates a voltage of +12 V from the voltage 56 V of the battery pack MOD1. The regulator Reg52 generates a voltage of 12 V+56 V=68 V from a voltage of 56 V+56 V=112 V of the battery pack MOD2. When the MOSFET Q2 is on, the light-emitting diode emits light and the phototransistor of the photocoupler IFS22 is turned on. Accordingly, the light-emitting diode of the photocoupler IFS21 emits light and the phototransistor is turned on.

An anode voltage of the light-emitting diode of the photocoupler IFS21 becomes 11 V when the MOSFET Q1 is on, and becomes 12 V when the MOSFET Q1 is off. A cathode voltage of the light-emitting diode of the photocoupler IFS21 becomes 9 V when the MOSFET Q1 is on, and becomes 12 V when the MOSFET Q1 is off. A collector voltage of the phototransistor of the photocoupler IFS21 becomes 12 V when the MOSFET Q1 is on, and becomes 12 V when the MOSFET Q1 is off. An emitter voltage of the phototransistor of the photocoupler IFS21 becomes 11 V when the MOSFET Q1 is on, and becomes 0 V when the MOSFET Q1 is off. Accordingly, the maximum value of the voltage which is applied to the photocoupler IFS21 is 12 V.

An anode voltage of the light-emitting diode of the photocoupler IFS22 becomes 11 V+56 V when the MOSFET Q2 is on, and becomes 12 V+56 V when the MOSFET Q2 is off. A cathode voltage of the light-emitting diode of the photocoupler IFS22 becomes 9 V+56 V when the MOSFET Q2 is on, and becomes 12 V+56 V when the MOSFET Q2 is off. A collector voltage of the phototransistor of the photocoupler IFS22 becomes 12 V when the MOSFET Q2 is on, and becomes 12 V when the MOSFET Q2 is off. An emitter voltage of the phototransistor of the photocoupler IFS22 becomes 11 V when the MOSFET Q2 is on, and becomes 12 V when the MOSFET Q2 is off. Accordingly, the maximum value of the voltage which is applied to the photocoupler IFS22 is 56 V.

In other battery packs MOD, the maximum value of a voltage which is applied to the photocoupler is 56 V, as is the case with the battery pack MOD2. Thus, in the yet other embodiment, the maximum voltage which is applied to the photocoupler can be the voltage of the battery unit of one battery pack (56 V, in the above-described example). Accordingly, a use of a photocoupler which has an especially high breakdown voltage is not demanded. Further, the power-on signal from the external integrated controller ICNT can be directly transmitted (that is, via no microprocessor) to the controller CNT of each of the battery packs MOD, thereby being able to prevent variance in the signal transmission time among the battery packs.

5. Modification

The values of the voltages described in the above embodiments are illustrative examples and may be arbitrarily changed depending on an application and the like. Further, in the above description, four embodiments are separately described, but the configuration obtained by combining two or more of these embodiments is applicable.

The present application contains subject matter related to that disclosed in Japanese Priority Patent Application JP 2010-129730 filed in the Japan Patent Office on Jun. 7, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A battery system, comprising:
a battery pack configured to include at least a plurality of battery cells that are connected in series, a monitor that monitors a state of the plurality of battery cells, and a controller to which an output of the monitor is supplied;
a battery pack module in which the battery pack in a first order to the battery pack in an Nth order are connected in series; and
an integrated controller that is connected with the battery pack in the first order of the battery pack module; wherein
isolators are respectively disposed among the battery pack in the first order to the battery pack in the Nth order, and
a signal is transmitted from the battery pack in an order of n−1 (N≥n≥2) to the battery pack in an order of n via one of the isolators,
wherein,
n and N are positive integers,
a reference potential point of the battery pack in the order of n−1 (N≥n≥2) is connected to a primary side of the isolator that is included in the battery pack in the order of n, and
a secondary side of the isolator that is included in the battery pack in the order of n is connected to a reference potential point of the battery pack in the order of n.

2. A battery system, comprising:
a battery pack configured to include at least a plurality of battery cells that are connected in series, a monitor that monitors a state of the plurality of battery cells, and a controller to which an output of the monitor is supplied;
a battery pack module in which the battery pack in a first order to the battery pack in an Nth order are connected in series; and
an integrated controller that is connected with the battery pack in the first order of the battery pack module; wherein
isolators are respectively disposed among the battery pack in the first order to the battery pack in the Nth order, and
a signal is transmitted from the battery pack in an order of n−1 (N≥n≥2) to the battery pack in an order of n via one of the isolators,
wherein,
n and N are positive integers,
each of the battery pack in the first order to the battery pack in the Nth order includes a direct-current voltage generation unit that generates a direct current voltage from the battery cells,
a switching unit is disposed between the direct-current voltage generation unit and the controller, and
ON/OFF of the switching unit is controlled by a signal from the integrated controller in an interlocking manner among the battery pack in the first order to the battery pack in the Nth order.

3. A battery system, comprising:
a battery pack configured to include at least a plurality of battery cells that are connected in series, a monitor that monitors a state of the plurality of battery cells, and a controller to which an output of the monitor is supplied;
a battery pack module in which the battery pack in a first order to the battery pack in an Nth order are connected in series; and an integrated controller that is connected with the battery pack in the first order of the battery pack module; wherein isolators are respectively disposed among the battery pack in the first order to the battery pack in the Nth order, and a signal is transmitted from the battery pack in an order of n−1 (N≥n≤2) to the battery pack in an order of n via one of the isolators, wherein,
n and N are positive integers, each of the isolators includes an input side buffer and an output side buffer, a serial signal line from the integrated controller is connected to the input side buffer of the battery pack in the first order, a signal is outputted from a part between the isolator and the output side buffer of the battery pack in the first order to the controller of the battery pack in the first order, a signal is inputted into the input side buffer of the battery pack in the order of n from the output side buffer of the battery pack in the order of n−1 (N≥n≤2), and a signal is outputted from the output side buffer of the battery pack in the order of n to the controller of the battery pack in the order of n.

4. A battery system, comprising:
a battery pack configured to include at least a plurality of battery cells that are connected in series, a monitor that monitors a state of the plurality of battery cells, and a controller to which an output of the monitor is supplied;

a battery pack module in which the battery pack in a first order to the battery pack in an Nth order are connected in series; and an integrated controller that is connected with the battery pack in the first order of the battery pack module; wherein isolators are respectively disposed among the battery pack in the first order to the battery pack in the Nth order, and a signal is transmitted from the battery pack in an order of n−1 (N≥n≤2) to the battery pack in an order of n via one of the isolators, wherein,
n and N are positive integers, each of the battery pack in the first order to the battery pack in the Nth order includes a direct-current voltage generation unit that generates a direct-current voltage from the battery cells, a switching unit that is controlled by an output of each of the isolators of the battery pack in the first order to the battery pack in the Nth order is provided between the battery cells and the direct-current voltage generation unit, an input side of the isolator of the battery pack in the first order is connected to an output side of the integrated controller, the switching unit is controlled by an output of the isolator of the battery pack in the order of n−1 (N≥n≤2), an output of the direct-current voltage generation unit of the battery pack in the order of n−1 is supplied to an input side of the isolator of the battery pack in the order of n, and the switching unit of the battery pack in the first order to the switching unit of the battery pack in the Nth order are controlled in an interlocking manner by an output signal of the integrated controller.

5. A battery system, comprising:
a battery pack configured to include at least a plurality of battery cells that are connected in series, a monitor that monitors a state of the plurality of battery cells, and a controller to which an output of the monitor is supplied;

a battery pack module in which the battery pack in a first order to the battery pack in an Nth order are connected in series; and an integrated controller that is connected with the battery pack in the first order of the battery pack module; wherein isolators are respectively disposed among the battery pack in the first order to the battery pack in the Nth order, and a signal is transmitted from the battery pack in an order of n−1 (N≥n≥2) to the battery pack in an order of n via one of the isolators, wherein,
n and N are positive integers, each of the battery pack in the first order to the battery pack in the Nth order includes a direct-current voltage generation unit that generates a direct-current voltage from the battery cells, a switching unit is provided to an input side of each of the isolators of the battery pack in the first order to the battery pack in the Nth order, one end of an output side of the isolator of the battery pack in the order of n (N≥n≥2) is connected to an output side of the direct-current voltage generation unit of the battery pack in the order of n−1 and the other end of the output side of the isolator is connected to an input side of the isolator of the battery pack in the order of n−1, an output side of the isolator of the battery pack in the first order is connected to an input side of the integrated controller, and the switching unit is usually on and turning off of the switching unit is transmitted to the integrated controller by any of the controller of the battery pack in the first order to the controller of the battery pack in the Nth order.

* * * * *